(12) United States Patent
Yazawa

(10) Patent No.: US 12,141,917 B2
(45) Date of Patent: Nov. 12, 2024

(54) STORAGE MEDIUM STORING DATA GENERATION PROGRAM AND THREE-DIMENSIONAL MODELING SYSTEM

(71) Applicant: Brother Kogyo Kabushiki Kaisha, Nagoya (JP)

(72) Inventor: Hiroaki Yazawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 68 days.

(21) Appl. No.: 17/936,177

(22) Filed: Sep. 28, 2022

(65) Prior Publication Data

US 2023/0015470 A1    Jan. 19, 2023

Related U.S. Application Data

(63) Continuation of application No. PCT/JP2021/010046, filed on Mar. 12, 2021.

(30) Foreign Application Priority Data

Sep. 30, 2020 (JP) ................. 2020-165974

(51) Int. Cl.
*G06T 17/00* (2006.01)
*B29C 64/393* (2017.01)
*B29C 64/40* (2017.01)

(52) U.S. Cl.
CPC ............ *G06T 17/00* (2013.01); *B29C 64/393* (2017.08); *B29C 64/40* (2017.08)

(58) Field of Classification Search
CPC ....... G06T 17/00; B29C 64/393; B29C 64/40; B29C 64/386; B22F 10/47; B33Y 50/00; B33Y 30/00
See application file for complete search history.

(56) References Cited

U.S. PATENT DOCUMENTS 8,980,150 B2   3/2015  Oshima
2013/0244040 A1   9/2013  Oshima
(Continued)

FOREIGN PATENT DOCUMENTS

EP          3425461 A1   1/2019
JP       2003-136605 A   5/2003
(Continued)

OTHER PUBLICATIONS

May 25, 2021—International Search Report—Intl App PCT/JP2021/010046.
(Continued)

*Primary Examiner* — William A Beutel
(74) *Attorney, Agent, or Firm* — Banner & Witcoff, Ltd.

(57) ABSTRACT

A data generation program includes instructions of: acquiring three-dimensional data representing a three-dimensional shape of a three-dimensional product; acquiring an arrangement condition for arranging a support member to the three-dimensional product; setting an extending direction, a width direction, and a height direction of the support member; adding a cutting margin of a particular thickness to a cutting surface of the three-dimensional product at one side in the height direction; setting the support member in accordance with the arrangement condition, one end of the support member in the extending direction being connected to the cutting margin added to the three-dimensional product; setting a beam, the beam being spaced from the three-dimensional product having the cutting margin in the extending direction, the beam extending in the width direction; generating three-dimensional modeling data for modeling a modeled object by using a three-dimensional modeling apparatus; and outputting the three-dimensional modeling data.

19 Claims, 12 Drawing Sheets

(56) References Cited

U.S. PATENT DOCUMENTS

| | | |
|---|---|---|
| 2017/0252981 A1 | 9/2017 | Li |
| 2018/0079141 A1 | 3/2018 | Yoshida et al. |
| 2022/0009164 A1* | 1/2022 | Jacimovic ............. B29C 64/188 |
| 2022/0363004 A1* | 11/2022 | de Marcillac .......... B33Y 50/00 |

FOREIGN PATENT DOCUMENTS

| | | |
|---|---|---|
| JP | 2013-184405 A | 9/2013 |
| JP | 2017-077683 A | 4/2017 |
| JP | 2017-518199 A | 7/2017 |
| WO | 2015-145346 A1 | 10/2015 |

OTHER PUBLICATIONS

May 12, 2021—Written Opinion—App PCT/JP2021/010046.
Sep. 27, 2024—(EP) Search Report—App 21874775.6.

* cited by examiner

STORAGE MEDIUM STORING DATA GENERATION PROGRAM AND THREE-DIMENSIONAL MODELING SYSTEM

REFERENCE TO RELATED APPLICATIONS

This is a Continuation Application of International Application No. PCT/JP2021/010046 filed on Mar. 12, 2021, which claims priority from Japanese Patent Application No. 2020-165974 filed on Sep. 30, 2020. The entire content of each of the prior applications is incorporated herein by reference.

BACKGROUND ART

A data generation program and a three-dimensional modeling system are conventionally known.

DESCRIPTION

A three-dimensional product manufacturing system includes a three-dimensional modeling apparatus which performs three-dimensional modeling based on three-dimensional modeling data, and a machining apparatus which cuts a three-dimensional shaped object in accordance with NC data to produce a three-dimensional product. The NC data is generated based on three-dimensional modeling data.

The three-dimensional modeling data generated by the modeling apparatus includes data for modeling a support member. The support member extends in connection with the three-dimensional product and regulates the position of the three-dimensional product during three-dimensional modeling. The three-dimensional modeling apparatus is configured to, in response to a user's operation, add data for modeling the support member to three-dimensional modeling data for modeling a three-dimensional product based on the shape of the three-dimensional product. The support member may be arranged for the three-dimensional product in view of being removed from the three-dimensional product. However, it is a cumbersome task for a designer to arrange a support member for a three-dimensional product considering that the support member is removed from the three-dimensional product.

In view of the foregoing, an example of an object of this disclosure is to provide a data generation program and a modeling system configured to generate three-dimensional modeling data for modeling a three-dimensional product and a support member connecting to the three-dimensional product by using a three-dimensional modeling apparatus, considering that the support member is removed from the three-dimensional product.

According to one aspect, this specification discloses a non-transitory computer-readable storage medium storing a data generation program including a set of program instructions for a computer including a controller. When the set of program instructions is executed by the controller, the controller acquires three-dimensional data representing a three-dimensional shape of a three-dimensional product. The controller acquires an arrangement condition for arranging a support member to the three-dimensional product, the support member being connected to the three-dimensional product. The controller sets an extending direction, a width direction, and a height direction of the support member. The controller adds a cutting margin of a particular thickness to a cutting surface of the three-dimensional product at one side in the height direction. The controller sets the support member in accordance with the arrangement condition. The support member extends in the extending direction. One end of the support member in the extending direction is connected to the cutting margin added to the three-dimensional product. The controller sets a beam, the beam being spaced from the three-dimensional product having the cutting margin in the extending direction. The beam extends in the width direction. The beam is connected to an other end of the support member in the extending direction. The controller generates three-dimensional modeling data for modeling a modeled object by using a three-dimensional modeling apparatus. The modeled object includes the three-dimensional product, the cutting margin, the support member, and the beam. The controller outputs the three-dimensional modeling data. Because the one end of the support member in the extending direction is connected to the cutting margin added to the three-dimensional product, the support member is removed together with the cutting margin by removing the cutting margin from the three-dimensional product by the cutting apparatus. Thus, it is unnecessary for a user to provide a step of removing the support member separately from a step of removing the cutting margin from the modeled object, in order to obtain a three-dimensional product from the modeled object. In other words, the data generation program generates three-dimensional modeling data for modeling the three-dimensional product and the support member connecting to the three-dimensional product by using a three-dimensional modeling apparatus, taking into consideration that the support member is removed from the three-dimensional product.

According to another aspect, this specification also discloses a three-dimensional modeling system including a computer, a three-dimensional modeling apparatus, and a cutting apparatus. The computer includes an interface and a controller. The controller acquires three-dimensional data representing a three-dimensional shape of a three-dimensional product. The controller acquires an arrangement condition for arranging a support member to the three-dimensional product. The support member is connected to the three-dimensional product. The controller sets an extending direction, a width direction, and a height direction of the support member. The controller adds a cutting margin of a particular thickness to a cutting surface of the three-dimensional product at one side in the height direction. The controller sets the support member in accordance with the arrangement condition. The support member extends in the extending direction. One end of the support member in the extending direction is connected to the cutting margin added to the three-dimensional product. The controller sets a beam, the beam being spaced from the three-dimensional product having the cutting margin in the extending direction. The beam extends in the width direction. The beam is connected to an other end of the support member in the extending direction. The controller generates three-dimensional modeling data for modeling a modeled object by using the three-dimensional modeling apparatus. The modeled object includes the three-dimensional product, the cutting margin, the support member, and the beam. The controller generates three-dimensional cutting data for cutting and removing, with the cutting apparatus, the cutting margin and the one end of the support member in the modeled object. The controller outputs the three-dimensional modeling data and the three-dimensional cutting data through the interface. The three-dimensional modeling apparatus is configured to model the modeled object in accordance with the three-dimensional modeling data. The cutting apparatus is configured to cut the modeled object in accordance with the three-dimensional cutting data to obtain the three-dimensional product. Thus, the three-dimensional modeling system saves the time and effort of the user to generate three-dimensional cutting data separately from three-dimensional modeling data. The three-dimensional modeling system generates the three-dimensional cutting data by using the processing necessary to generate the three-dimensional modeling data, which simplifies processing compared with a case where the three-dimensional cutting data is generated separately from three-dimensional modeling data.

FIG. 1 is a block diagram showing a configuration of a three-dimensional modeling system 9 including a 3D printer 11, a cutting apparatus 12, and a data generation apparatus 1.

FIG. 2 is a flowchart of a data generation process executed by the data generation apparatus 1.

FIG. 3 is an explanatory diagram of three-dimensional data 20, a three-dimensional product 40 represented by the three-dimensional data 20, and a setting screen 30 displayed on a display 7.

Figure 6:
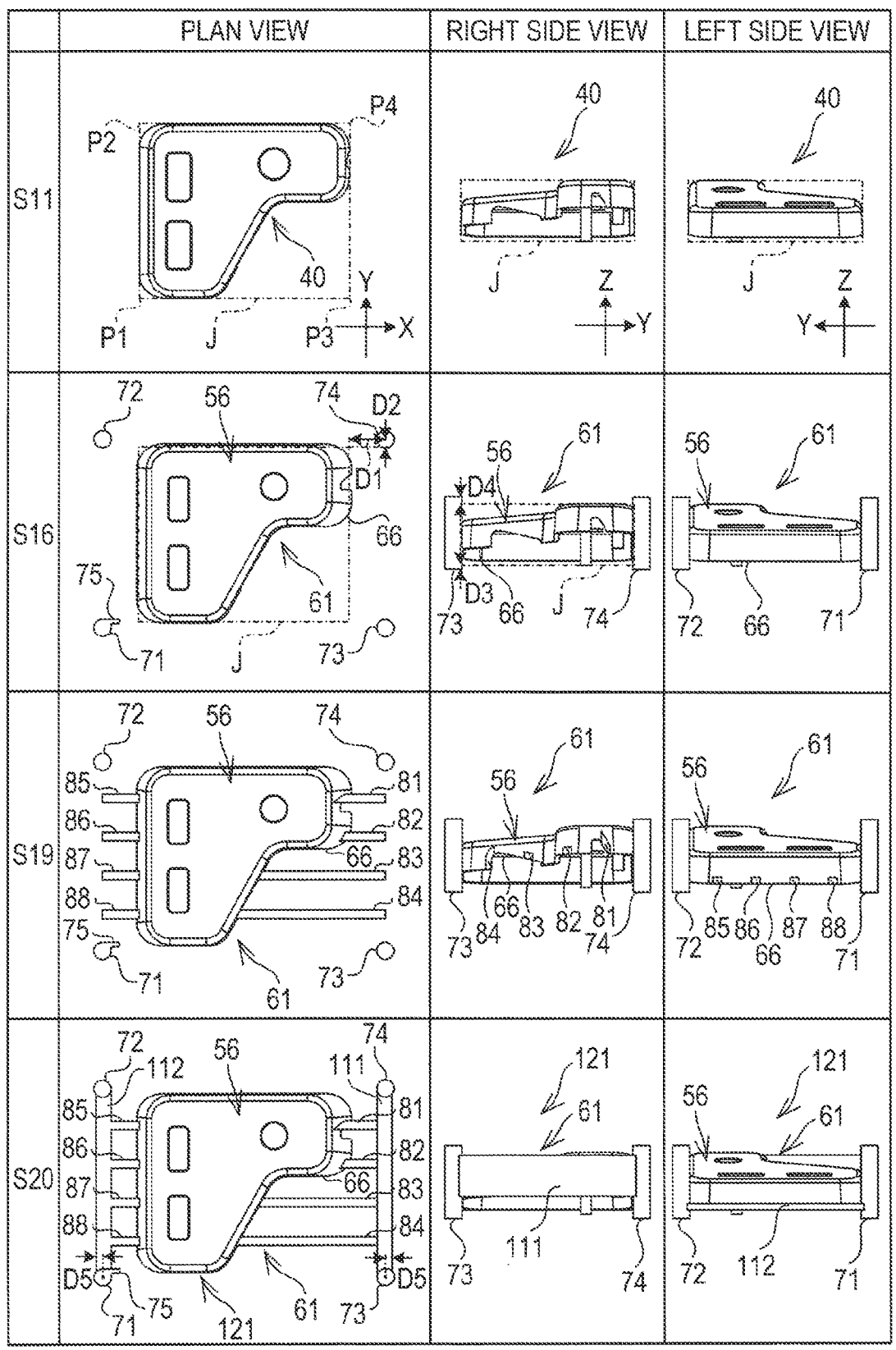

FIG. 6 is an explanatory diagram showing in a matrix form a process in which four columns 71 to 74, a cutting margin 56, support members 81 to 88, and beams 111 and 112 are sequentially set in the three-dimensional product 40 of the specific example 1 in the data generation process.

Figure 7:
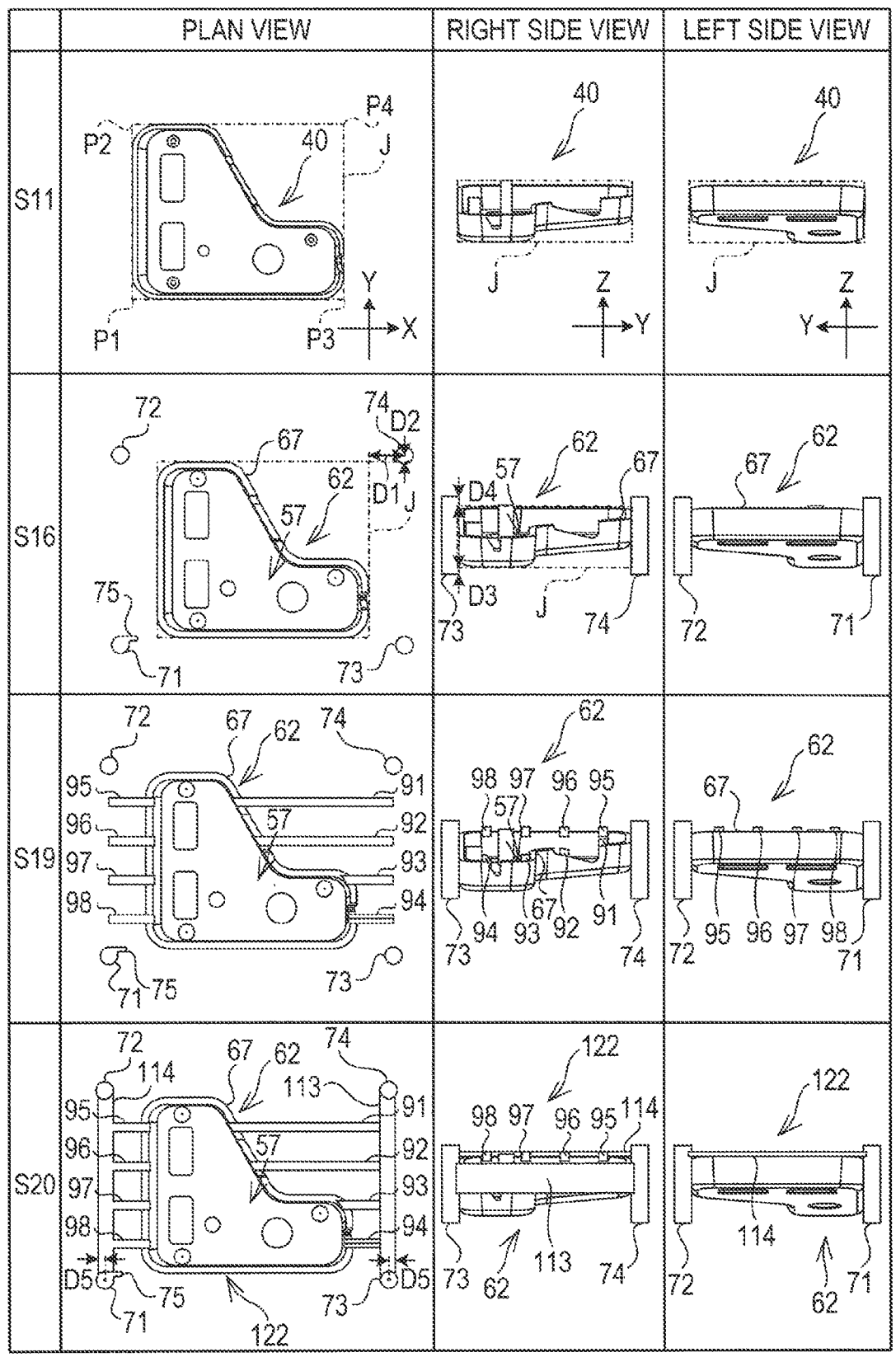

FIG. 7 is an explanatory diagram showing in a matrix form a process in which four columns 71 to 74, a cutting margin 57, support members 91 to 98, and beam 113 and 114 are sequentially set in the three-dimensional product 40 of the specific example 2 in the data generation process.

Figure 8:
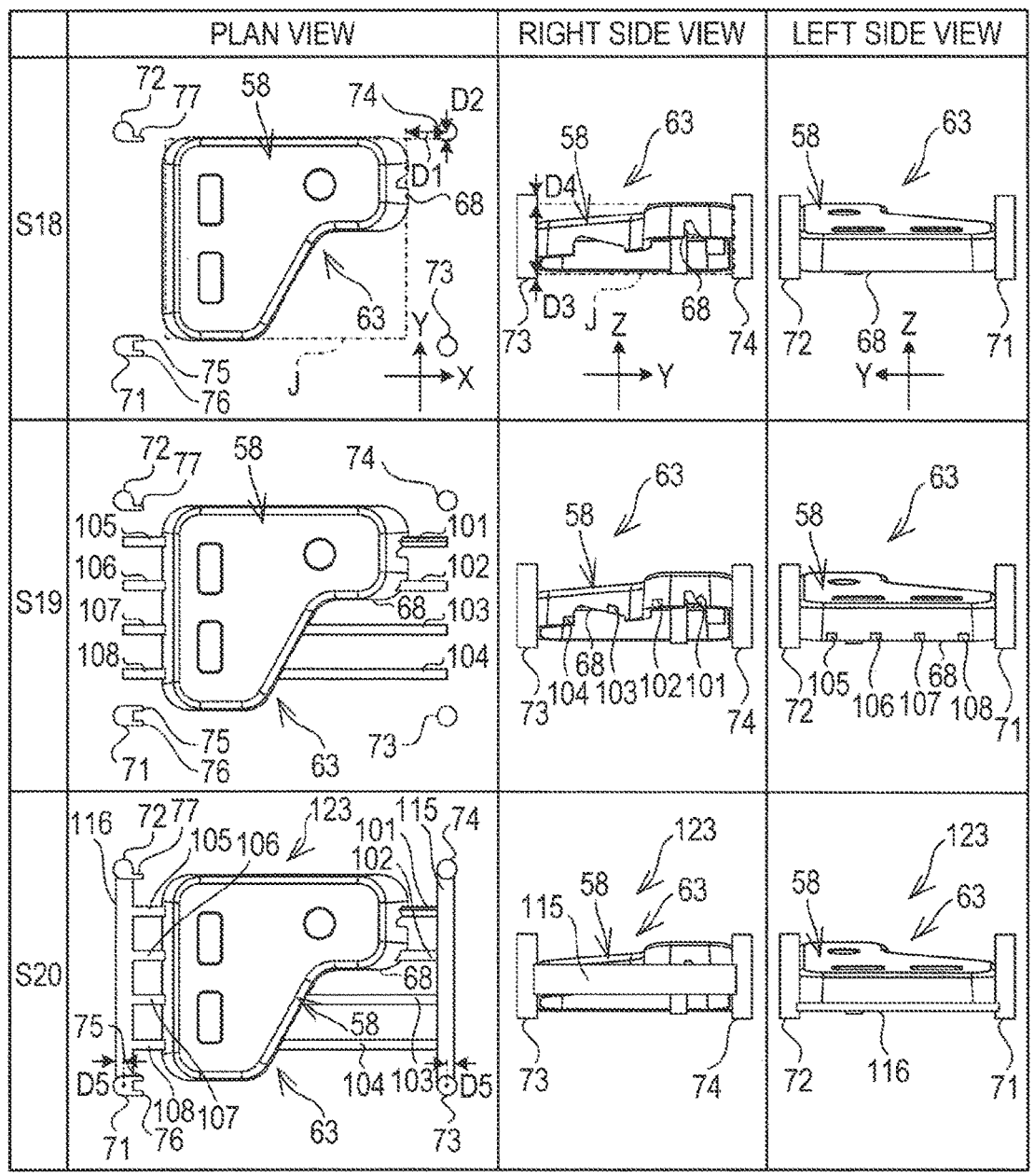

FIG. 8 is an explanatory diagram showing in a matrix form a process in which four columns 71 to 74, a cutting margin 58, support members 101 to 108, and beams 115 and 116 are sequentially set in the three-dimensional product 40 of the specific example 3 in the data generation process.

Figure 9:
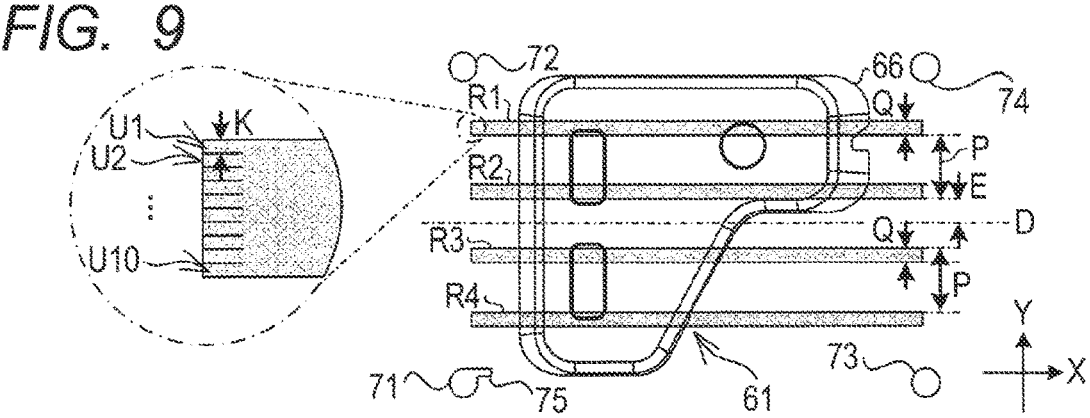

FIG. 9 is an explanatory diagram of a process of setting support members in a three-dimensional product 61 in the specific example 1.

Figure 10:
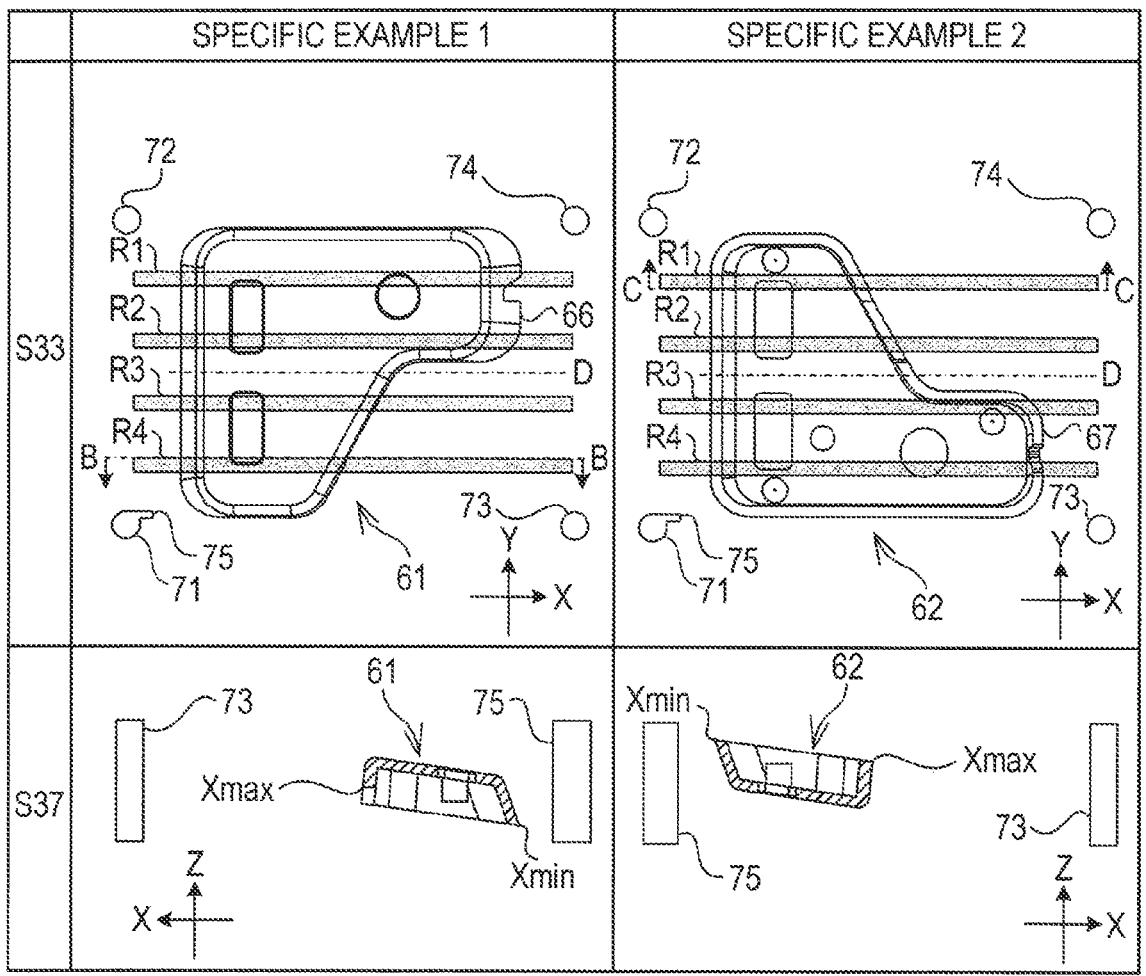

FIG. 10 is an explanatory diagram showing in a matrix form a process of setting support members in each of the three-dimensional product 61 of the specific example 1 and a three-dimensional product 62 of the specific example 2.

Figure 11:
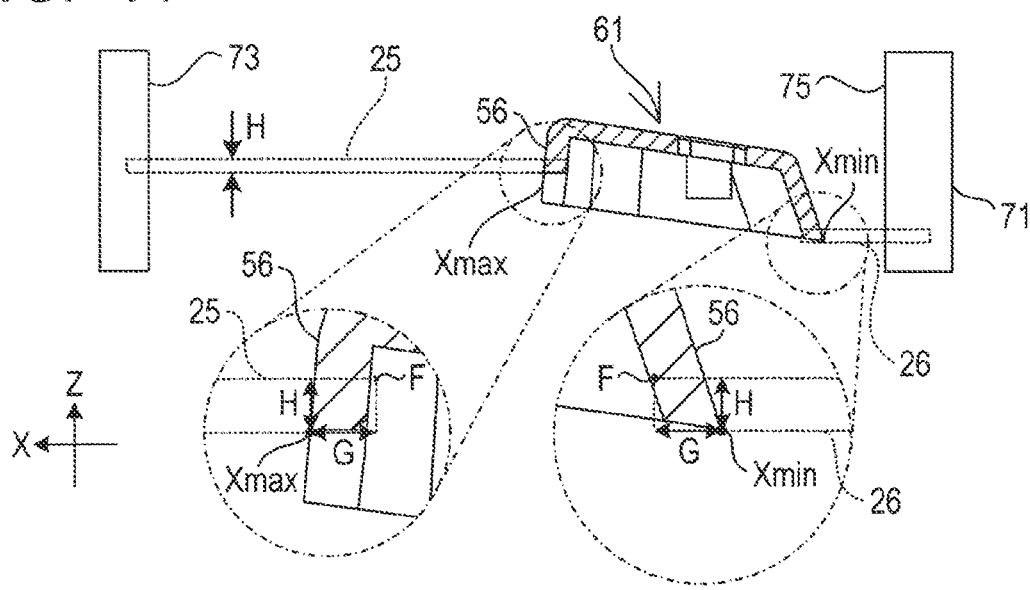

FIG. 11 is an explanatory diagram of a process of temporarily setting support members 25 and 26 in the three-dimensional product 61 of the specific example 1 using a cross section taken along line B-B in the part of S33 in FIG. 10.

Figure 12:
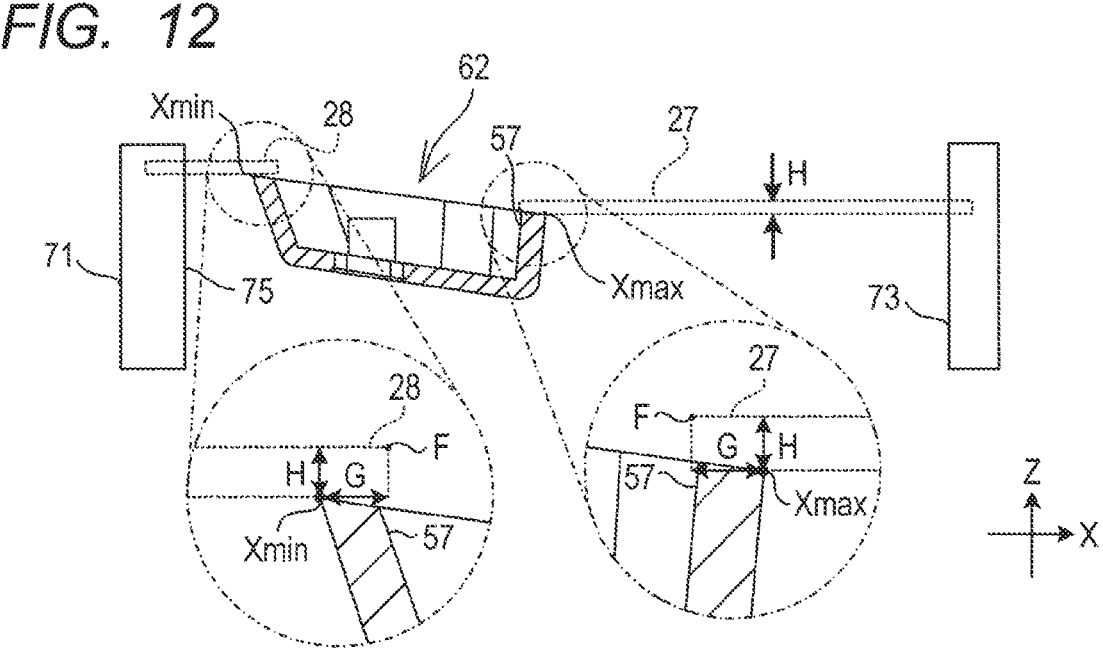

FIG. 12 is an explanatory diagram of a process of temporarily setting the support members 27 and 28 in the three-dimensional product 62 of the specific example 2 using a cross section taken along line C-C in the part of S33 in FIG. 10.

Figure 13:
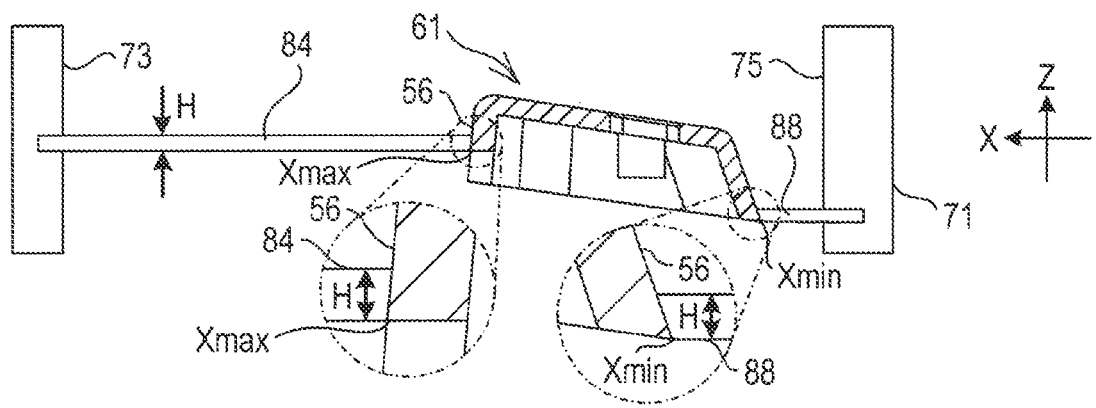

FIG. 13 is an explanatory diagram of a process for setting support members 84 and 88 in the three-dimensional product 61 of the specific example 1 using a cross section taken along line B-B in the part of S33 in FIG. 10.

Figure 14:
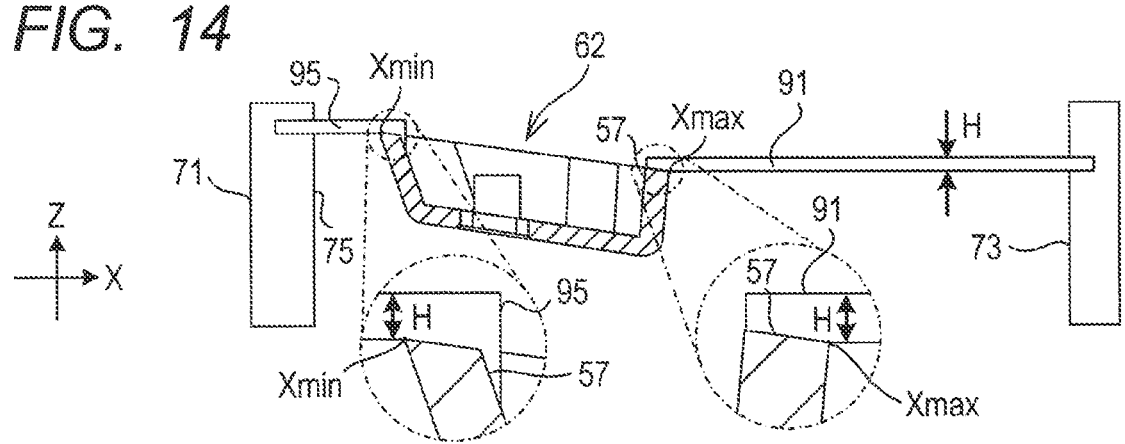

FIG. 14 is an explanatory diagram of a process for setting the support members 91 and 95 in the three-dimensional product 62 of the specific example 2 using a cross section taken along line C-C in the part of S33 in FIG. 10.

Figure 15:
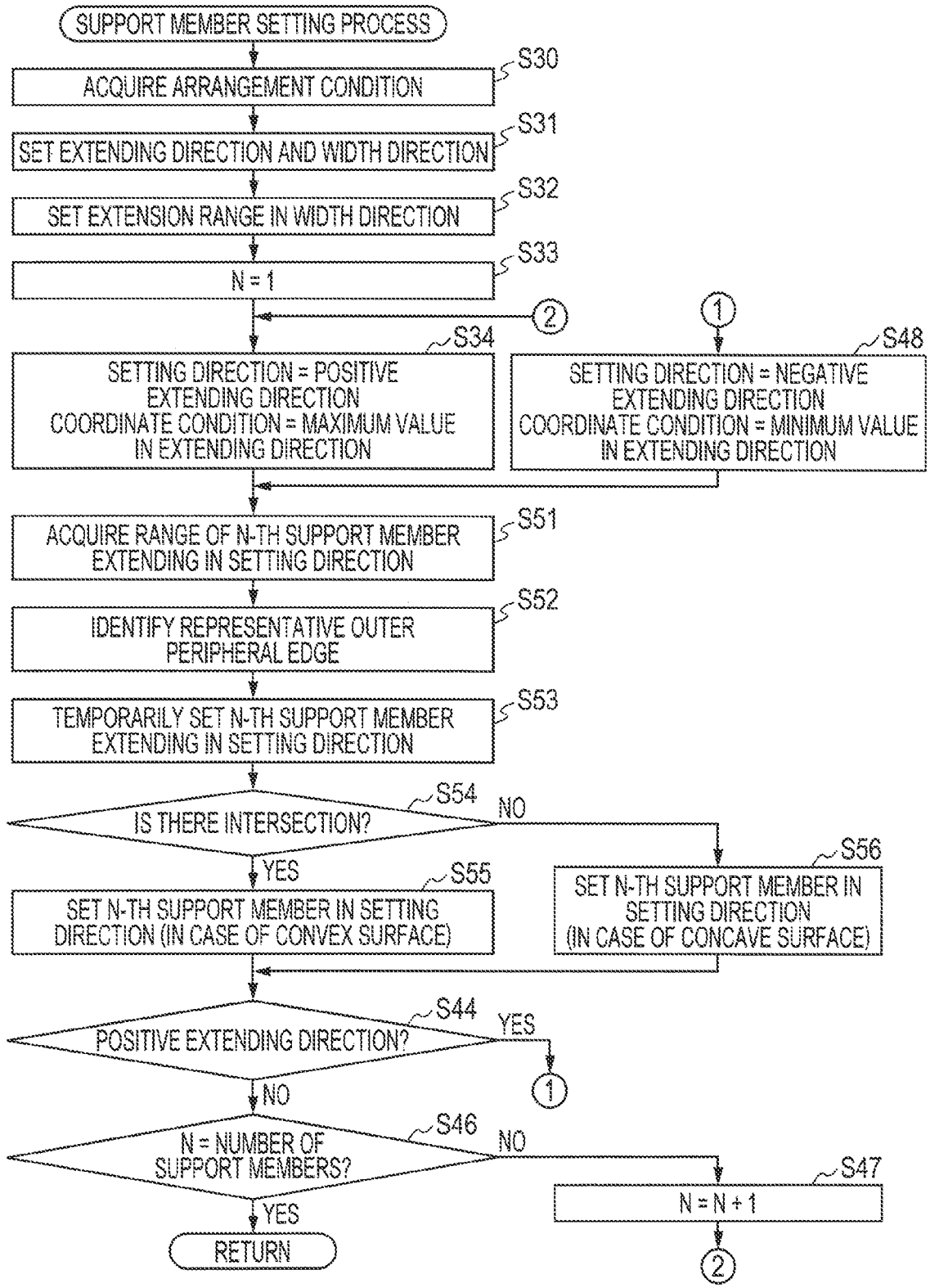

FIG. 15 is a flowchart of a support member setting process executed in a data generation process.

Figure 16A:
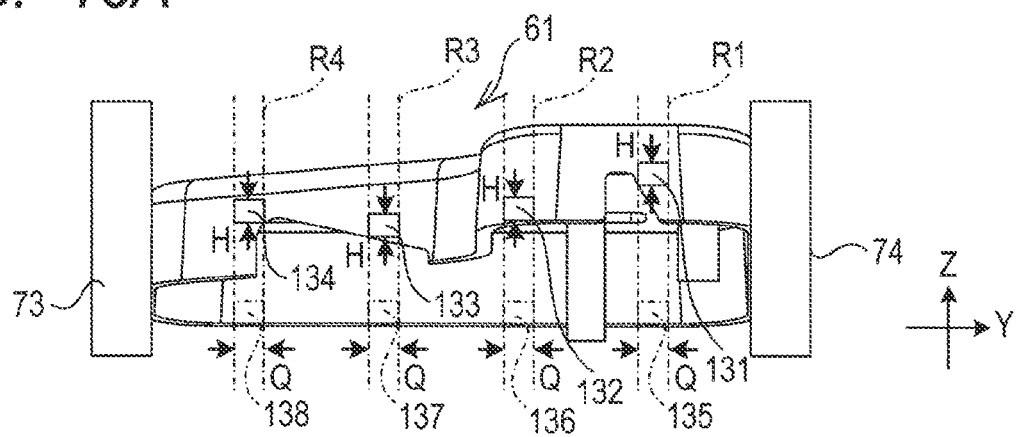

FIG. 16A is an explanatory view of support members 131 to 138 set in the three-dimensional product 61 of the specific example 1 according to the data generation process.

Figure 16B:
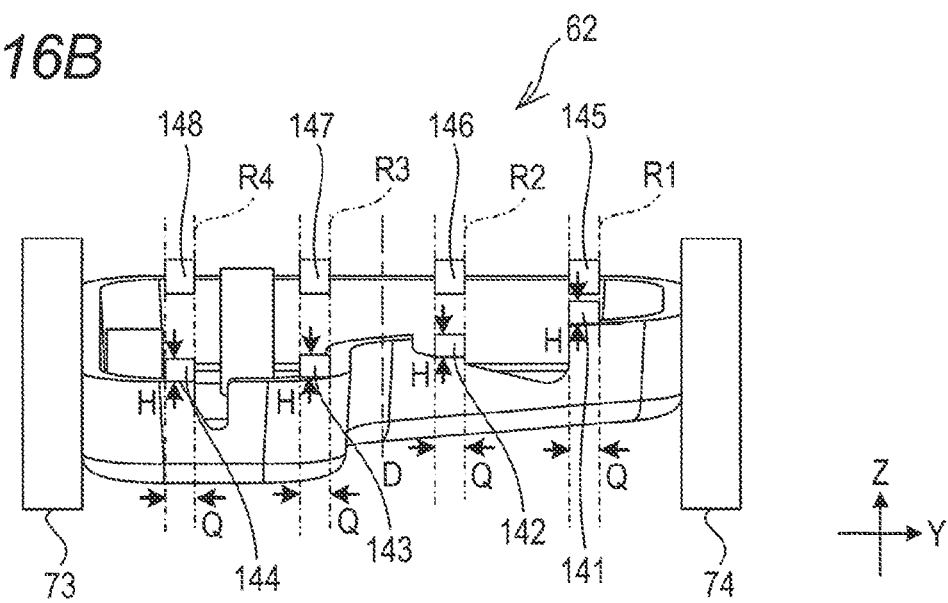

FIG. 16B is an explanatory diagram of support members 141 to 148 set in the three-dimensional product 62 of the specific example 2 according to the data generation process.

Figure 1:
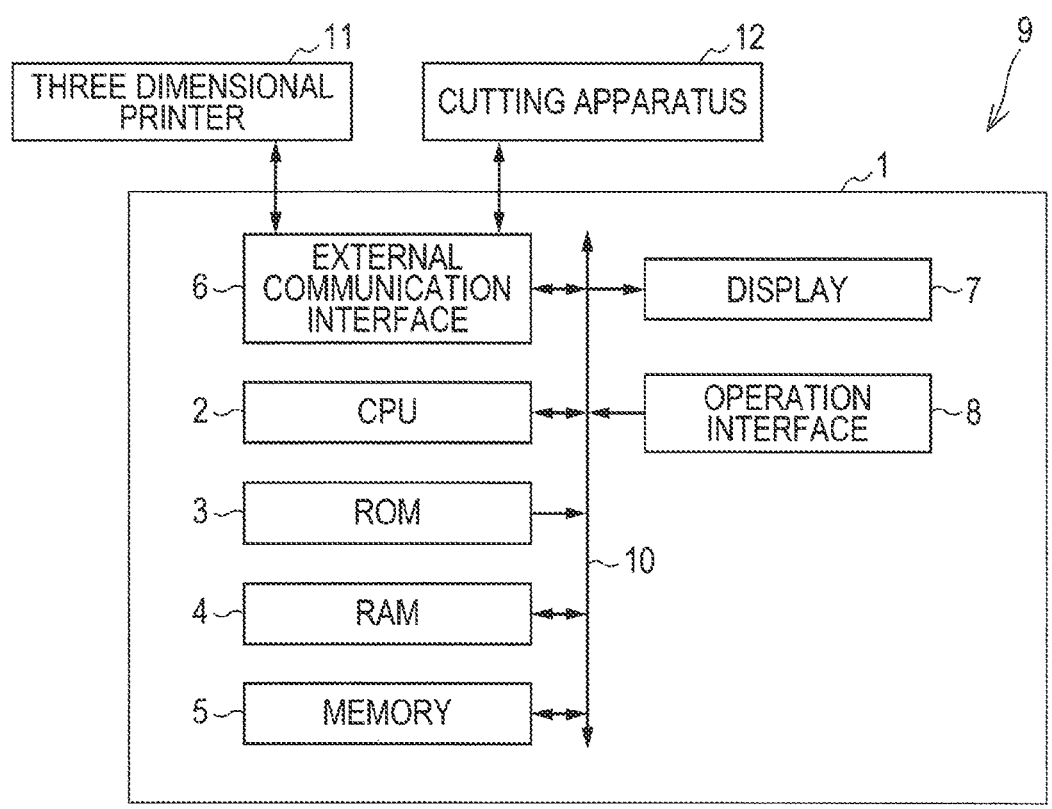

A three-dimensional modeling system 9 (hereinafter simply referred to as "system 9") in first and second embodiments will be described with reference to the drawings. The configurations common to the systems 9 in the first and second embodiments will be described with reference to FIG. 1 and FIG. 2. As shown in FIG. 1, the system 9 includes a 3D (three-dimensional) printer 11, a cutting apparatus 12, and a data generation apparatus 1. The 3D printer 11 is configured to model a three-dimensional model based on three-dimensional modeling data. The 3D printer 11 may be any known type of powder bed fusion type, directed energy type, binder jetting type, sheet lamination type, photopolymerization curing (stereolithography) type, material extrusion type, and material jetting type, and the type is not particularly limited. The cutting apparatus 12 is configured to cut a three-dimensional model into a particular shape by using a tool such as a cutting blade, based on three-dimensional cutting data. For example, the cutting apparatus 12 cuts a three-dimensional model by three-dimensionally moving a tool relative to the three-dimensional model.

The data generation apparatus 1 is a known personal computer, and generates the three-dimensional modeling data and the three-dimensional cutting data based on the three-dimensional data representing a shape of a three-dimensional product, by executing the data generation program described later. The data generation apparatus 1 includes a CPU 2, a ROM 3, a RAM 4, a memory 5, an external communication interface 6, a display 7, an operation interface 8, and a bus 10. The CPU 2 controls the data generation apparatus 1, and is electrically connected to the ROM 3, the RAM 4, the memory 5, the external communication interface 6, the display 7, and the operation interface 8, via the bus 10. The ROM 3 stores programs such as BIOS to be executed by the CPU 2. The RAM 4 temporarily stores various types of data. The memory 5 is a nonvolatile memory, and stores programs and various setting values for use in controlling the operation of the data generation apparatus 1. The display 7 is configured to display images, and is a liquid crystal display, as an example. The operation interface 8 allows to input a signal into the CPU 2 in response to the operation performed by a user. The operation interface 8 is, for example, at least a keyboard, a mouse, a touch panel, or a joystick. The external communication interface 6 connects the data generation apparatus 1 to external devices such as the 3D printer 11 and the cutting apparatus 12.

Figure 3:
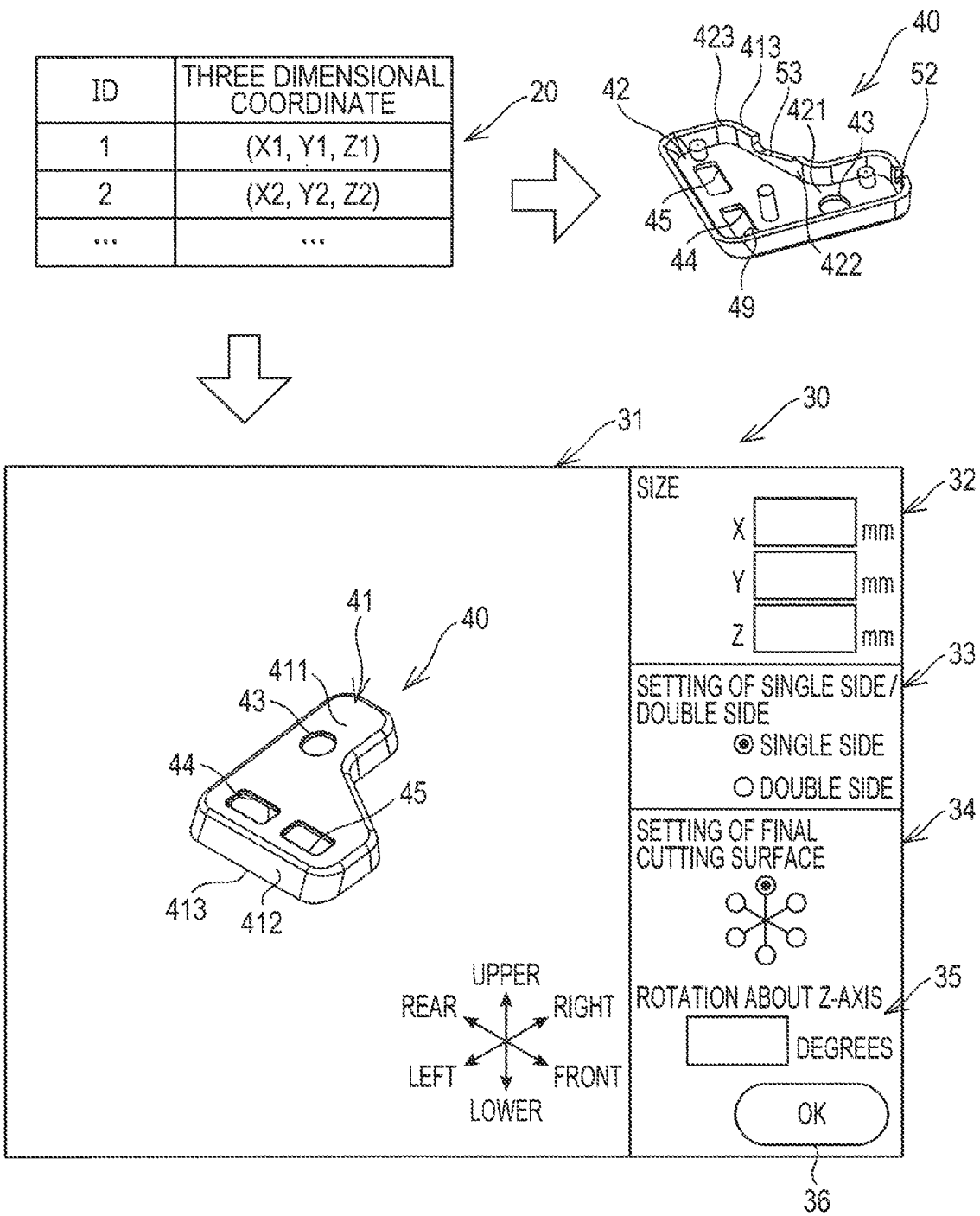

The outline of the data generation process to be performed by the data generation apparatus 1 of the system 9 will be described by use of specific examples 1 to 3 shown in FIG. 3 and FIGS. 4A-4C. The specific examples 1 to 3 differ from each other in the setting of the surfaces to be cut by the cutting apparatus 12. In each of the specific examples 1 to 3, the data generation apparatus 1 generates the three-dimensional modeling data for use in modeling modeled objects 121, 122, or 123 shown in FIGS. 4A-4C, based on three-dimensional data 20 representing a three-dimensional shape of a three-dimensional product 40 shown in FIG. 3. The three-dimensional data is generated by a three-dimensional CAD, a three-dimensional modeler, a three-dimensional scanner, and so on. The data may be in any format, for example, STL (Standard Triangulated Language), IGES (Initial Graphics Exchange Specification), STEP (Standard for the Exchange of Product model data), or AMF (Additive Manufacturing). The three-dimensional data may be generated by the data generation apparatus 1 or by an external apparatus. For example, as shown in FIG. 3, the three-dimensional product 40 is a three-dimensional model that is formed to protrude toward one side in a particular thickness as a whole, and includes a convex surface 41, a concave surface 42, and cutouts 52, 53. The convex surface 41 has a plane part 411, a side surface 412, and an outer peripheral edge 413. The plane part 411 extends in a planar shape. The plane part 411 of the three-dimensional product 40 has holes 43 to 45 formed to penetrate in the thickness direction. The hole 43 is formed in a circular shape, and the holes 44, 45 are formed in rectangular shapes. The side surface 412 is connected to the outer periphery of the plane part 411.

The side surface 412 extends in the direction of intersecting the extension surface of the plane part 411 and separating from the center of the plane part 411 as it separates farther from the plane part 411. The outer peripheral edge 413 is the edge of the side surface 412 on the side far from the plane part 411. The concave surface 42 is the surface opposite to the convex surface 41. The concave surface 42 includes a plane part 421 corresponding to the plane part 411, a side surface 422 corresponding to the side surface 412, and an inner peripheral edge 423 corresponding to the outer peripheral edge 413. The cutouts 52, 53 are the portions notched, toward the plane part 421, from the edges 413, 423 formed on the side surfaces 412, 422.

Figure 4A:
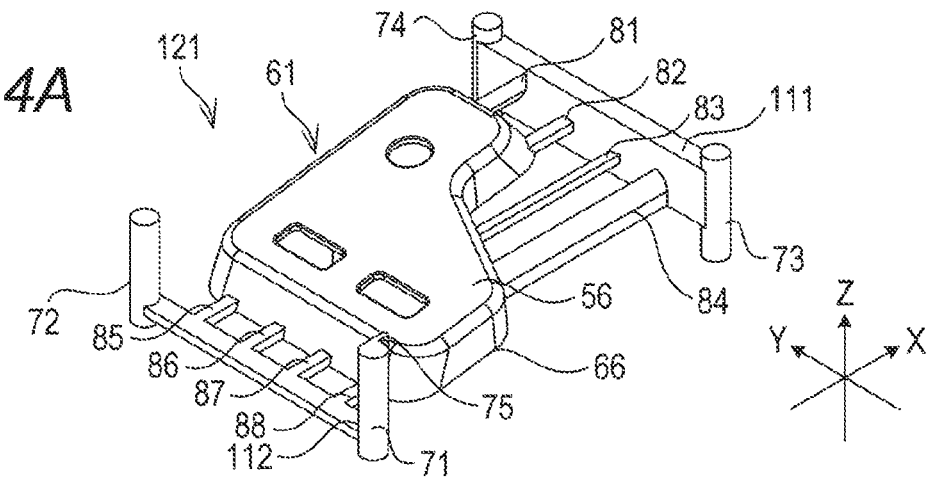
FIG. 4A is a perspective view of a modeled object 121 which is represented by three-dimensional modeling data of a specific example 1 generated by the data generation process.
Figure 4B:
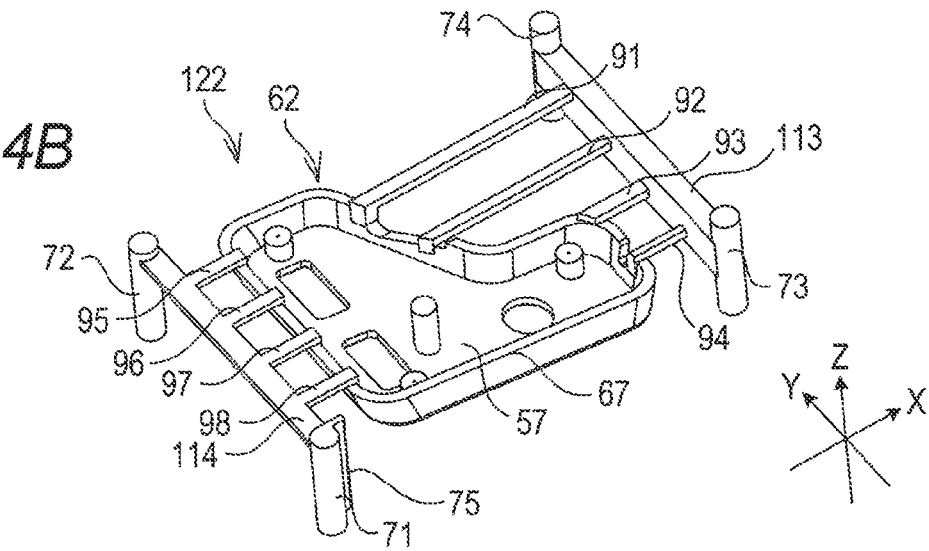
FIG. 4B is a perspective view of a modeled object 122 which is represented by three-dimensional modeling data of a specific example 2.
Figure 4C:
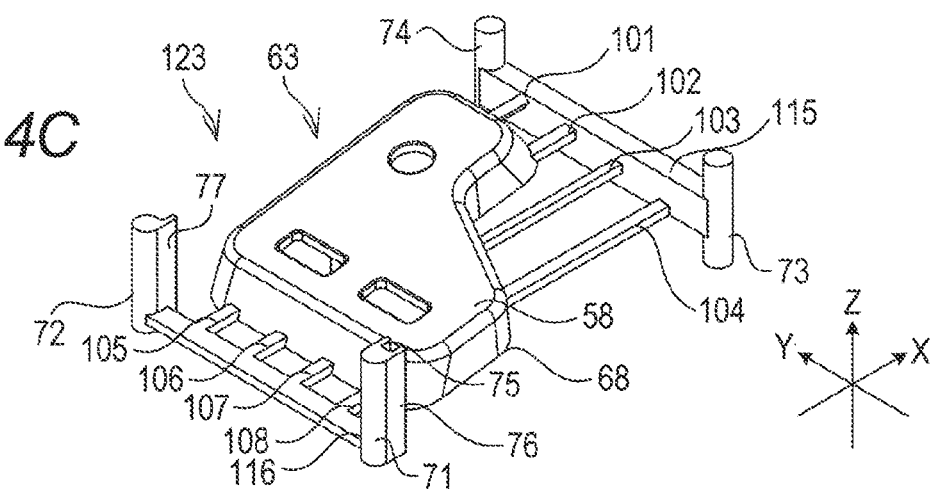
FIG. 4C is a perspective view of a modeled object 123 which is represented by three-dimensional modeling data of a specific example 3.

In the specific example 1 shown in FIG. 4A, the convex surface 41 of the three-dimensional product 40 is set as a cutting surface (the surface to be cut). In the specific example 1, the data generation process is performed to generate the three-dimensional modeling data for use in modeling the modeled object 121 including the three-dimensional product 40 added with a cutting margin (cutting allowance or machining allowance) 56, four columns 71 to 74, a plate-shaped part 75, support members 81 to 88, and beams 111, 112. The added cutting margin 56 is formed in a particular thickness, on the cutting surface. The support members 81 to 88 regulate the position of the three-dimensional product 40 during the three-dimensional modeling, especially at the time of cutting. The data generation apparatus 1 sets one ends of the support members 81 to 88 so as to be connected to the cutting margin 56, by considering that the cutting apparatus 12 cuts and removes the support members 81 to 88 from the three-dimensional product 40. In one example, the data generation apparatus 1 in the present embodiment sets the support members 81 to 88 at the positions allowing that the one ends of the support members 81 to 88 are at least partially in contact with an outer peripheral edge 66 of a three-dimensional product 61. Similarly, in the specific example 2 shown in FIG. 4B, the concave surface 42 of the three-dimensional product 40 is set as the cutting surface. In the specific example 2, the data generation process is performed to generate the three-dimensional modeling data for use in modeling the modeled object 122 including the three-dimensional product 40 added with a cutting margin 57, the four columns 71 to 74, the plate-shaped part 75, support members 91 to 98, and beams 113, 114. In one example, the data generation apparatus 1 sets the support members 91 to 98 at the positions allowing that one ends of the support members 91 to 98 are at least partially in contact with an outer peripheral edge 67 of a three-dimensional product 62. In the specific example 3 shown in FIG. 4C, both the convex surface 41 and the concave surface 42 of the three-dimensional product 40 are set as the surfaces to be cut, and the convex surface 41 is cut finally. In the specific example 3, the data generation process is performed to generate the three-dimensional modeling data for use in modeling the modeled object 123 including the three-dimensional product 40 added with a cutting margin 58, the four columns 71 to 74, the plate-shaped part 75 and plate-shaped parts 76, 77, support members 101 to 108, and beams 115, 116. In one example, the data generation apparatus 1 sets the support members 101 to 108 at the positions allowing that one ends of the support members 101 to 108 are at least partially in contact with an outer peripheral edge 68 of a three-dimensional product 63.

The data generation process to be performed by the CPU 2 of the data generation apparatus 1 in the first embodiment will be described by use of the specific examples 1 to 3, with reference to FIG. 2 to FIG. 14. The data generation process is started, when an instruction to start the process via the operation interface 8 is detected in the state where the three-dimensional data 20 to be processed is specified, and subsequently when the CPU 2 reads a program stored in the memory 5 into the RAM 4 and executes the program. Although the data generation process is performed at different timing in the specific examples 1 to 3, the processing to be performed in the examples will be described in parallel for the sake of simplicity of description. In the following description, when a three-dimensional model (for example, support member) is added or set for the three-dimensional product 40, the three-dimensional data representing the three-dimensional shape of the set three-dimensional model may be added to the three-dimensional data 20 of the three-dimensional product 40, or may be generated separately from the three-dimensional data 20 and stored in association with the three-dimensional data 20. The various set values to be referred to in the data generation process may be set in advance, may be automatically set from among multiple types of values according to the shape, the size and so on of the three-dimensional product 40, or may be set by a user via the operation interface 8.

Figure 2:
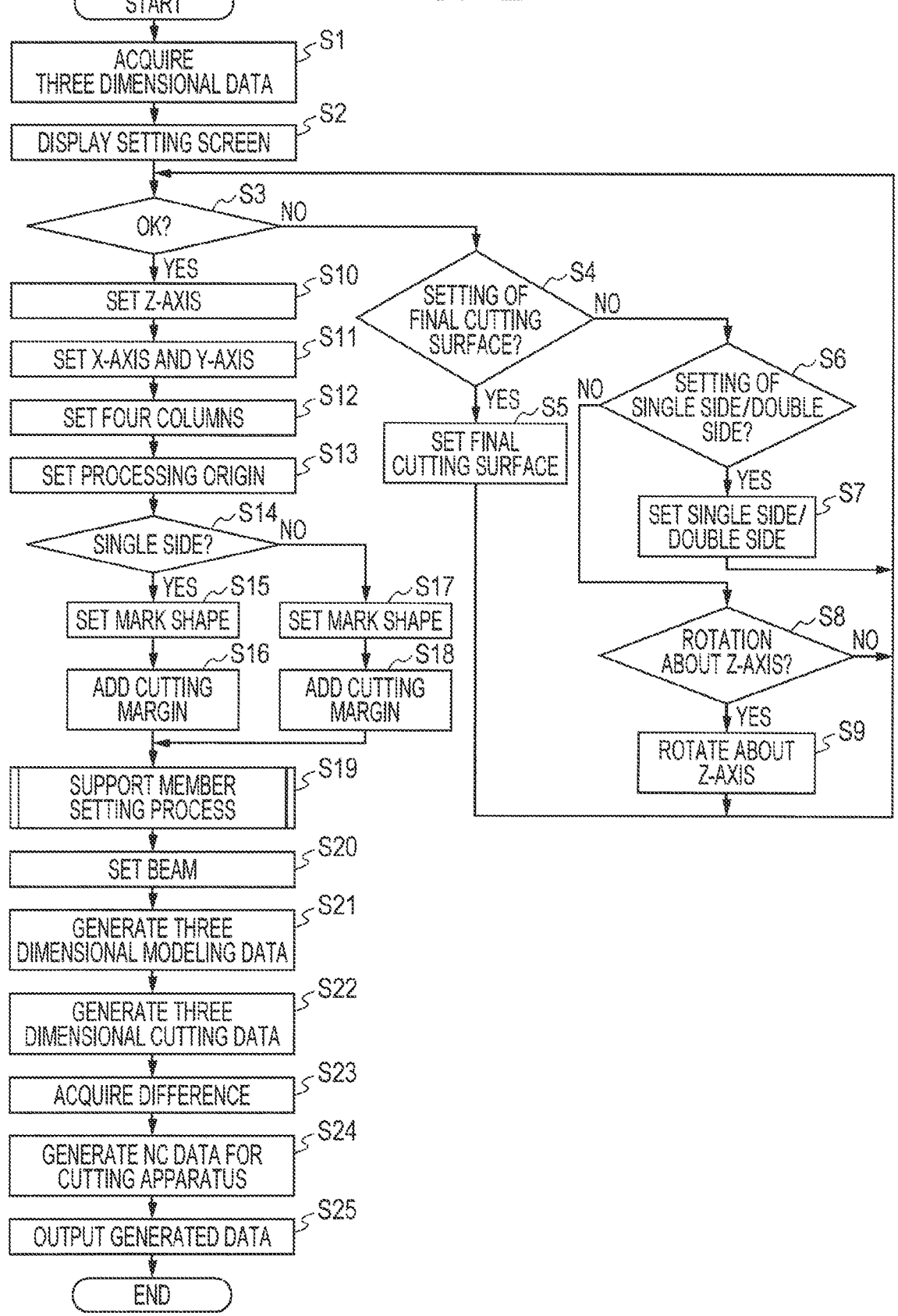

As shown in FIG. 2, the CPU 2 acquires the three-dimensional data 20 representing the three-dimensional shape of the three-dimensional product 40 (S1). In one example, the CPU 2 acquires the three-dimensional data 20 in an STL format schematically shown in FIG. 3 from an external device by wire or wireless communication. The three-dimensional data 20 in the STL format includes the three-dimensional coordinate data of the vertexes of a group of triangles representing the three-dimensional shape of the three-dimensional product 40.

The CPU 2 controls the display 7 to display a setting screen 30 (refer to FIG. 3) related to the three-dimensional data 20 acquired in S1 (S2). As shown in FIG. 3, the setting screen 30 includes fields 31 to 35 and a key 36. The field 31 displays the three-dimensional shape of the three-dimensional product 40 based on the three-dimensional data 20 acquired in S1. The CPU 2 initially displays, in the field 31, the three-dimensional shape of the three-dimensional product 40 by setting the X direction, the Y direction and the Z direction in the three-dimensional data 20 as a left-right direction, a front-rear direction, and an upper-lower direction, respectively. The positive X side, the positive Y side and the positive Z side correspond to the right side, the rear side and the upper side, respectively. The field 32 displays the overall sizes of the three-dimensional product 40 in the X direction, the Y direction and the Z direction based on the three-dimensional data 20 acquired in S1. In the field 33, the single-side/double-side setting is specified. The single-side/double-side setting is a setting for whether one side face in the height direction of the modeled object is set as the cutting surface (single-side), or both of one side face and the other side face in the height direction of the modeled object are set as the cutting surface (double-side) when the modeled object modeled by the 3D printer 11 is to be cut by the cutting apparatus 12. The single-side/double-side setting is selectively performed in a radio button. In the single-side/double-side setting, the single-side is set as the default. The one side and the other side in the height direction of the modeled object are set based on the final cutting surface by the cutting apparatus 12. The field 34 is a field for setting the final cutting surface. The final cutting surface is selectable from among the surface on the positive X side, the surface on the negative X side, the surface on the positive Y side, the surface on the negative Y side, the surface on the positive Z side, and the surface on the negative Z side. The surface on the positive Z side is set as the default. The field 35 is a field for specifying rotation about the Z axis. The field 35 is used to input the rotation angle at which the three-dimensional product 40 displayed in the field 31 rotates about the Z axis. The key 36 is operated to confirm and instruct the setting of conditions performed in the setting screen 30. In S3 to S9, the CPU 2 performs the processes of accepting changes in various types of settings via the setting screen 30.

The CPU 2 determines whether the operation of the key 36 has been detected, based on the output by the operation interface 8 (S3). When the operation of the key 36 has not been detected (S3: NO), the CPU 2 determines whether the selection in the setting of the final cutting surface in the field 34 has been detected, based on the output by the operation interface 8 (S4). When the selection in the setting of the final cutting surface has been detected (S4: YES), the CPU 2 sets the final cutting surface based on the output by the operation interface 8 and changes the three-dimensional shape displayed in the field 31 such that the final cutting surface faces upward (S5), and thereafter returns the processing to S3. In the specific examples 1, 3, the convex surface 41 is set as the final cutting surface. In the specific example 2, the concave surface 42 is set as the final cutting surface. When the selection in the setting of the final cutting surface has not been detected (S4: NO), the CPU 2 determines whether the selection in the single-side/double-side setting in the field 33 has been detected, based on the output by the operation interface 8 (S6). When the selection in the single-side/double-side setting has been detected (S6: YES), the CPU 2 sets single-side or double-side based on the output by the operation interface 8 (S7), and thereafter returns the processing to S3. In the specific examples 1 and 2, single-side is set in the single-side/double-side setting. In the specific example 3, double-side is set in the single-side/double-side setting. When the selection in the single-side/double-side setting has not been detected (S6: NO), the CPU 2 determines whether an instruction of the rotation about the Z axis in the field 35 has been detected, based on the output by the operation interface 8 (S8). When an instruction of the rotation about the Z axis has been detected (S8: YES), the CPU 2 rotates the three-dimensional product 40 displayed in the field 31, about the Z axis by the rotation angle inputted in the field 35, and changes the three-dimensional product 40 displayed in the field 31 according to the result of the rotation (S9), and thereafter returns the processing to S3. When no instruction of the rotation about the Z axis has been detected (S8: NO), the CPU 2 returns the processing to S3.

When in S3 the operation of the key 36 has been detected (S3: YES), the CPU 2 generates three-dimensional modeling data and three-dimensional cutting data based on the settings in the setting screen 30, and performs the processing of outputting the generated data. Specifically, the CPU 2 sets a new Z axis based on the setting in the setting screen 30 (S10). The CPU 2 sets the final cutting surface set in the field 34, to the new positive Z direction. The CPU 2 sets a new X axis and a new Y axis (S11). The CPU 2 sets, as the new X axis and the new Y axis, the longitudinal direction and the short direction, respectively, of the projected figure that is acquired when the three-dimensional product 40 is projected from the positive Z direction set in S11 onto the imaginary XY plane perpendicular to the Z axis. The CPU 2 performs the conversion of the three-dimensional data acquired in S1, based on the X axis, the Y axis and the Z axis newly set in S10 and S11. In the specific examples 1, 3, the X axis, the Y axis and the Z axis are set as shown in the row of S11 in FIG. 6. In the specific example 2, the X axis, the Y axis and the Z axis are set as shown in the row of S11 in FIG. 7. In each of FIG. 6 to FIG. 8, the plan view shows the object viewed from the positive Z side; the right side view shows the object viewed from the positive X side; and the left side view shows the object viewed from the negative X side.

The CPU 2 sets the four columns 71 to 74 for the three-dimensional product 40, based on the three-dimensional data converted according to the new X axis, the new Y axis, and the new Z axis (S12). The four columns 71 to 74 are disposed apart from the three-dimensional product 40 so as to extend in the Z direction, and are used to position the three-dimensional product 40 at the time of the three-dimensional modeling by the 3D printer 11. The CPU 2 uses, for example, the following procedure to set the four columns 71 to 74 for the three-dimensional product 40. The CPU 2 defines a smallest rectangular parallelepiped J that circumscribes the three-dimensional product 40, based on the minimum value of the X coordinate, the maximum value of the X coordinate, the minimum value of the Y coordinate, the maximum value of the Y coordinate, the minimum value of the Z coordinate, and the maximum value of the Z coordinate of the converted three-dimensional data. The rectangular parallelepiped J has two planes parallel to the XY plane, two planes parallel to the YZ plane, and two planes parallel to the ZX plane. The CPU 2 sets, as the positions of the center axes of the four columns 71 to 74, the points which are away from four vertexes P1 to P4 on a plane parallel to the XY plane in the directions away from the center of the three-dimensional product 40, by a particular distance D1 in the X direction and a particular distance D2 in the Y direction, respectively. The coordinates (X, Y) of the four vertexes P1 to P4 are respectively (the minimum value of the X coordinate, the minimum value of the Y coordinate), (the minimum value of the X coordinate, the maximum value of the Y coordinate), (the maximum value of the X coordinate, the minimum value of the Y coordinate), and (the maximum value of the X coordinate, the maximum value of the Y coordinate). The coordinates (X, Y) of the center axes of the four columns 71 to 74 corresponding to the four vertexes P1 to P4 are respectively (the value acquired by subtracting D1 from the minimum value of the X coordinate, the value acquired by subtracting D2 from the minimum value of the Y coordinate), (the value acquired by subtracting D1 from the minimum value of the X coordinate, the value acquired by adding D2 to the maximum value of the Y coordinate), (the value acquired by adding D1 to the maximum value of the X coordinate, the value acquired by subtracting D2 from the minimum value of the Y coordinate), and (the value by adding D1 to the maximum value of the X coordinate, the value acquired by adding D2 to the maximum value of the Y coordinate). The CPU 2 sets, as the extension range in the Z direction of the four columns 71 to 74, the range from the coordinate which is smaller by a particular value D3 than the minimum value of the Z coordinate of the three-dimensional product 40 (the value acquired by subtracting D3 from the minimum value of the Z coordinate) to the coordinate which is larger by a particular value D4 than the maximum value of the Z coordinate of the three-dimensional product 40 (the value acquired by adding D4 to the maximum value of the Z coordinate). The CPU 2 sets, as the four columns 71 to 74, the circular columns so as to extend in the set extension range in the Z direction and have a particular radius with the set center axes. The shape, the arrangement, the size, the extension range, and so on, of the columns 71 to 74 set in S12 may be changed as appropriate.

The CPU 2 sets a processing origin (S13). The processing origin is the machine origin serving as the reference used when the 3D printer 11 models the modeled object, and also the machine origin serving as the reference used when the cutting apparatus 12 cuts the modeled object. The processing origin for the 3D printer 11 and the processing origin for the cutting apparatus 12 may be different from each other. For example, the CPU 2 sets, as the processing origin, the position of the column 71 set in the negative X direction and the negative Y direction with respect to the three-dimensional product 40, among the positions of the four columns 71 to 74 set in S12. The processing origin in the Z direction may be set as appropriate. The CPU 2 determines whether single-side has been set in the single-side/double-side setting (S14). In the specific examples 1 and 2, the CPU 2 determines that single-side has been set in the single-side/double-side setting (S14: YES). As shown in the row of S16 in FIG. 6, in the specific example 1, the CPU 2 adds the plate-shaped part 75, as the mark of the processing origin, to the column 71 (the column set in the negative X direction and the negative Y direction among the four columns 71 to 74) in the three-dimensional product 40 (S15). The plate-shaped part 75 is located at a position in the positive X direction and in the positive Y direction from the center axis of the column 71, and has a particular length in the X direction and a particular width in the Y direction. The plate-shaped part 75 (and 76, 77) is used as a mark for an operator when the operator sets the modeled object on the cutting apparatus 12. The CPU 2 adds the cutting margin 56 having a particular thickness to the entirety of the convex surface 41 which serves as the cutting surface on the positive Z side of the three-dimensional product 40 (S16). In the specific example 1, the three-dimensional product 40 to which the cutting margin 56 is added is simply referred to as the three-dimensional product 61, and the outer peripheral edge 413 to which the cutting margin 56 is added is simply referred to as the outer peripheral edge 66. Similarly, in the specific example 2, as shown in the row of S16 in FIG. 7, in S15 the CPU 2 adds the plate-shaped part 75 to the column 71 among the columns 71 to 74, and in S16 adds the cutting margin 57 having a particular thickness to the entirety of the concave surface 42 and the surface between the inner peripheral edge 423 and the outer peripheral edge 413. In the specific example 2, the three-dimensional product 40 to which the cutting margin 57 is added is simply referred to as the three-dimensional product 62, and the outer peripheral edge 413 to which the cutting margin 57 is added is simply referred to as the outer peripheral edge 67.

In the specific example 3, the CPU 2 determines that double-side has been set in the single-side/double-side setting (S14: No). As shown in the row of S18 in FIG. 8, the CPU 2 adds the plate-shaped parts 75 and 76, as the mark of the processing origin, to the column 71 (the column set in the negative X direction and the negative Y direction among the four columns 71 to 74) in the three-dimensional product 40 (S17). The plate-shaped part 75 is located at a position in the positive X direction and in the positive Y direction from the center axis of the column 71, and has a particular length in the X direction and a particular width in the Y direction. The plate-shaped part 76 is located at a position in the positive X direction and in the negative Y direction from the center axis of the column 71, and has a particular length in the X direction and a particular width in the Y direction. The CPU 2 further adds the plate-shaped part 77 to the column 72 (the column set in the negative X direction and the positive Y direction) in the three-dimensional product 40. The plate-shaped part 77 is located at a position in the positive X direction and in the negative Y direction from the center axis of the column 72, and has a particular length in the X direction and a particular width in the Y direction. The CPU 2 adds the cutting margin 58 having a particular thickness to the surfaces to be cut on the positive Z side and the negative Z side of the three-dimensional product 40, that is, to the entirety of the convex surface 41 and to the entirety of the concave surface 42 (S18). In the specific example 3, the three-dimensional product 40 to which the cutting margin 58 is added is simply referred to as the three-dimensional product 63, and the outer peripheral edge 413 to which the cutting margin 58 is added is simply referred to as the outer peripheral edge 68. As described above, in the present embodiment, one of the cutting margins 56 to 58 having particular thicknesses is added to the outer peripheral edge 413 of the three-dimensional product 40, depending on whether the cutting surface of the three-dimensional product 40 is the convex surface 41, the concave surface 42, or both the convex surface 41 and the concave surface 42.

Figure 5:
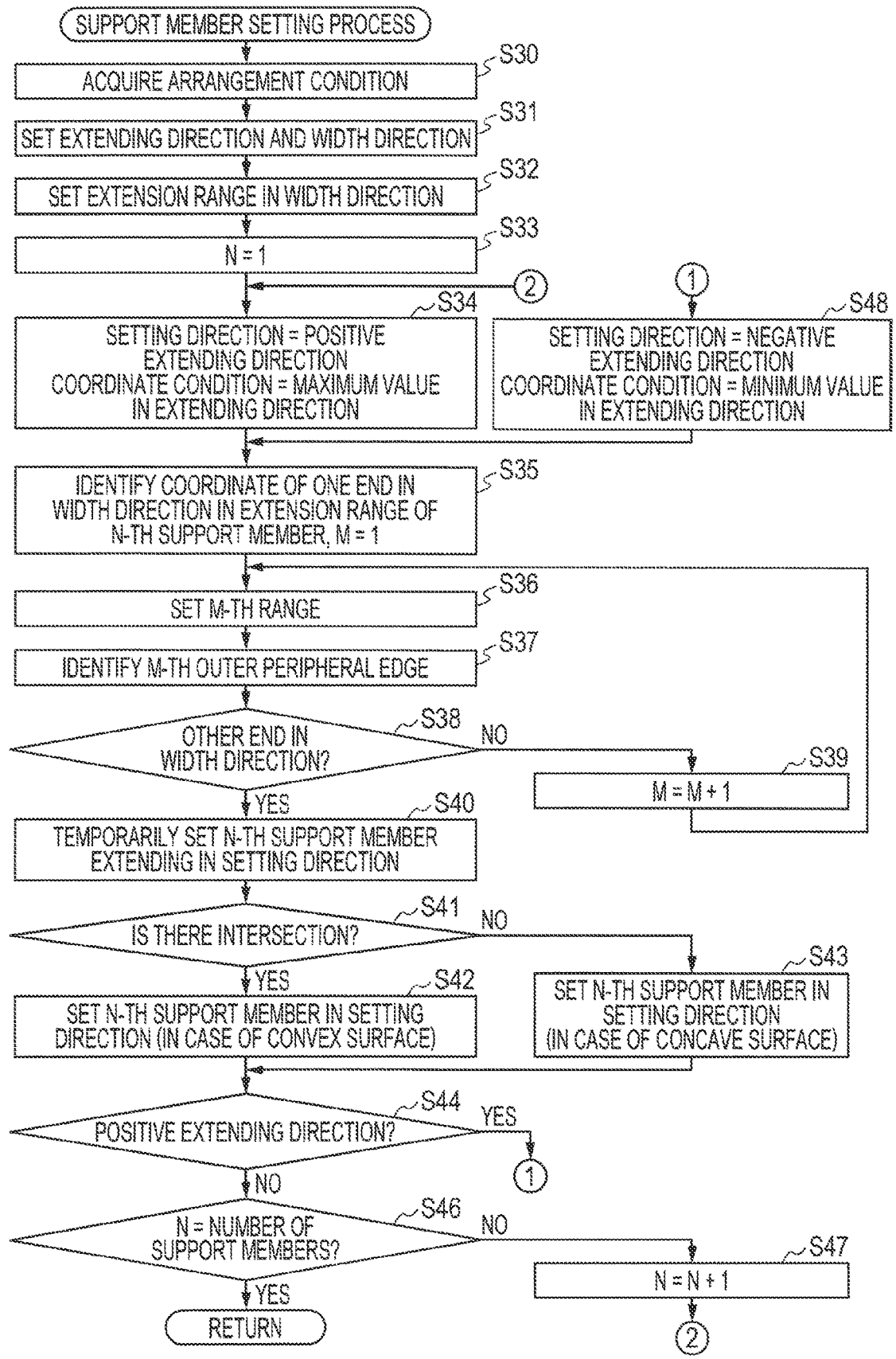
FIG. 5 is a flowchart of a support member setting process executed in the data generation process.

After S16 or S18, the CPU 2 performs a support member setting process (S19). In the support member setting process, a support member formed to extend in an extending direction according to arrangement conditions is set such that one end of the support member in the extending direction is connected to the cutting margin added to the three-dimensional product 40. The support member setting process in the specific examples 1 and 2 will be described with reference to FIG. 5 and FIG. 9 to FIG. 14. The support member setting process in the specific example 3 is the same as the processing in the specific example 1, and the description thereof is thus omitted. As shown in FIG. 5, the CPU 2 acquires the arrangement conditions indicating under what conditions the support members are arranged for the three-dimensional product 61 or 62 (S30). The arrangement conditions may be set in advance, may be set automatically according to the shape, the size and so on of the three-dimensional product 61 or 62, or may be set by a user. The arrangement conditions in the present embodiment are set automatically, regardless of the shape, the size and so on of the three-dimensional product 61 or 62, and include a width Q in the width direction of the support member, a height H in the height direction of the support member, and a pitch P in the width direction which is a distance corresponding to an interval between adjacent support members. The pitch P in the width direction of adjacent support members is set by considering the width in the width direction of adjacent support members. When set without considering the width in the width direction of adjacent support members, the pitch P may be an interval in the width direction of adjacent support members. The CPU 2 sets the width direction and the extending direction of the support members (S31). The width direction and the extending direction of the support members may be automatically set according to the shape, the size and so on of the three-dimensional product 40, or may be set by a user. The CPU 2 in the present embodiment automatically sets the X, Y, and Z directions based on the XYZ coordinate system set in S10 and S11. Specifically, the X direction is the extending direction of the support members, the Y direction is the width direction of the support members, and the Z direction is the height direction of the support members.

The CPU 2 sets, according to the arrangement conditions acquired in S30, the extension ranges in the width direction of the support members set for the three-dimensional product 61 or 62 (S32). In the specific example 1, as shown in FIG. 9 and in the row of S33 in FIG. 10, the CPU 2 sets extension ranges R1 to R4 of the support members according to an equation 1. Here, a center D in the Y direction of the three-dimensional product 61 is used as a reference; a distance E is the distance between the center D and the support member adjacent to the center D; the pitch P is the distance in the width direction of adjacent support members; and the width Q is the width in the width direction of the support members. The variables in the equation 1 are set so as to satisfy an equation 2. The value of n in the equations 1 and 2 is an integer.

$$Y = D \pm E, D \pm (E + P \times n) \quad \text{Equation 1}$$

$$\text{Maximum size of three-dimensional product in } Y \text{ direction}/2 > (E + P \times n + Q) \quad \text{Equation 2}$$

The extension ranges R1 to R4 for the three-dimensional product 61 are set in the order from the positive Y direction side. Similarly, in the specific example 2, as shown in the row of S33 in FIG. 10, the CPU 2 sets the extension ranges R1 to R4 of the support members. The CPU 2 sets 1 as a variable N (S33). The variable N is used to read out the extension ranges R1 to R4 of the support members set in S33 in the order from the range on the positive Y side. The CPU 2 sets the positive extending direction as a setting direction, and sets the maximum value in the extending direction as a coordinate condition (S34). The setting direction is the extending direction of the support members for the three-dimensional product 61 or 62. The coordinate condition is a condition for identifying the outer peripheral edge 66 or 67 of the three-dimensional product 61 or 62. When the setting direction is the positive extending direction, the coordinate condition is the maximum value in the extending direction. When the setting direction is the negative extending direction, the coordinate condition is the minimum value in the extending direction.

The CPU 2 identifies the maximum value of the Y coordinate in the extension range of the Nth support member as the coordinate of one end in the width direction in the extension range of the Nth support member, and sets 1 as a variable M (S35). The variable M is used to read out ranges obtained by dividing each of the extension ranges R1 to R4 set in S33 by a width K into a plurality of ranges, in the order from the range on the positive Y side. In one example, as shown in FIG. 9, the CPU 2 in the present embodiment divides each of the extension ranges R1 to R4 by the width K into ten ranges, and reads out ranges U1 to U10 in this order. The CPU 2 sets the Mth range in the extension range of the Nth support member, according to the coordinate identified in S35, the variable M, and the width K (S36). In the specific example 1, when the variable N is 1 and the variable M is 1, the range U1 shown in FIG. 9 is set as the Mth range in the extension range of the Nth support member. In the specific example 1, the CPU 2 identifies the outer peripheral edge 66 of the three-dimensional product 61 in the range set in S36 according to the coordinate condition set in S34 or S48 (S37). In the specific example 2, the CPU 2 identifies the outer peripheral edge 67 of the three-dimensional product 62 in the range set in S36 according to the coordinate condition set in S34 or S48 (S37). The row of S37 of the specific example 1 in FIG. 10 shows a cross-sectional view of the specific example 1 taken along a B-B line shown in the row of S33, viewed from the direction of the arrow. The row of S37 of the specific example 2 shows a cross-sectional view of the specific example 2 taken along a C-C line shown in the row of S33, viewed from the direction of the arrow. In the specific example 1, when the variable N is 4 and the variable M is 1, as shown in the row of S37 of the specific example 1 in FIG. 10, the CPU 2 identifies a point Xmax having the maximum value of the X coordinate of the three-dimensional product 61, as the coordinate of the outer peripheral edge 66 in the range set in S36, and stores the point Xmax in association with the variable N and the variable M. Similarly, in the specific example 2, when the variable N is 1 and the variable M is 10, as shown in the row of S37 of the specific example 2 in FIG. 10, the CPU 2 identifies the point Xmax having the maximum value of the X coordinate of the three-dimensional product 62, as the coordinate of the outer peripheral edge 67 in the range set in S36, and stores the point Xmax in association with the variable N and the variable M. The CPU 2 determines whether the Mth range set in S36 includes the other end in the width direction in the extension range of the Nth support member (S38). When the variable M is 10, the CPU 2 in the present embodiment determines that the Mth range includes the other end in the width direction in the extension range of the Nth support member. When the set Mth range does not include the other end in the width direction in the extension range of the Nth support member (S38: NO), the CPU 2 increments the variable M by 1 (S39), and thereafter returns the processing to S36. The repeated execution of S37 allows to acquire ten coordinates respectively corresponding to the ranges U1 to U10 for the extension range of the Nth support member.

When the set Mth range includes the other end in the width direction in the extension range of the Nth support member (S38: YES), the CPU 2 temporarily sets the Nth support member that extends in the setting direction set in S34, within the extension range of the Nth support member, for the three-dimensional product 61 or 62 (S40). The CPU 2 temporarily sets the Nth support member that extends in the setting direction for the three-dimensional product 61 or 62 in accordance with the following procedure, for example. As shown in FIG. 11, when the variable N is 4 in the specific example 1, the CPU 2 sets a point F which is separated from the point Xmax having the maximum value in the X direction by a particular distance G in the negative X side and separated by a height H in the positive Z side, with respect to each of the plurality of coordinates identified in S37. The CPU 2 sets the extension range in the height direction of the support member (the extension range in the Z direction) from the point Xmax to the point F, and sets the extension range in the extending direction (the extension range in the X direction) from the point F to the center axes of the columns 73, 74 positioned in the positive X side with respect to the three-dimensional product 61. The CPU 2 temporarily sets, to the three-dimensional product 61, the three-dimensional model extending in the extension range in the extending direction, the extension range in the height direction of the support member, and the extension range in the width direction of the support member set in S32, as a fourth support member 25 of the specific example 1 that extends in the setting direction. Similarly, as shown in FIG. 12, when the variable N is 1 in the specific example 2, the CPU 2 temporarily sets, to the three-dimensional product 62, the three-dimensional model extending in the extension range in the extending direction of the support member, the extension range in the height direction of the support member, and the extension range in the width direction set in S32, as a first support member 27 of the specific example 2 that extends in the setting direction.

The CPU 2 determines whether there is an intersection between the three-dimensional product 61 and the positive Z-side surface of the support member 25 or the support member 27 temporarily set in S40 (S41). When there is an intersection as in the support member 25 of the specific example 1 (S41: YES), the CPU 2 performs a process of setting a support member on the convex surface 41 (S42). Specifically, as shown in FIG. 13, the CPU 2 identifies the intersection surface where the support member 25 temporarily set in S40 and the three-dimensional product 61 intersect each other, changes the end on the negative X side of the support member 25 temporarily set in S40 to the identified intersection surface, and sets the Nth support member 84 that extends in the setting direction set in S34 to the three-dimensional product 61. In other words, the support member 84 is set such that the end on the negative X side of the support member 84 is connected to the cutting margin 56 of the three-dimensional product 61. When there is no intersection as in the support member 27 of the specific example 2 (S41: NO), the CPU 2 performs a process of setting a support member on the concave surface 42 (S43). Specifically, as shown in FIG. 14, the CPU 2 identifies the intersection surface where the support member 27 temporarily set in S40 and the three-dimensional product 62 intersect each other, changes the end on the negative X side of the support member 27 temporarily set in S40 to the identified intersection surface, and sets the first support member 91 that extends in the setting direction set in S34, to the three-dimensional product 62. If there is no intersection where the support member 27 temporarily set in S40 and the three-dimensional product 62 intersect each other, the CPU 2 extends the negative Z-side surface of the support member 27 temporarily set in S40 to the position at which the support member 27 makes contact with the three-dimensional product 62, toward the negative Z side.

After the process of S42 or S43, the CPU 2 determines whether the setting direction is the positive extending direction (S44). When the setting direction is the positive extending direction (S44: YES), the CPU 2 sets the negative extending direction as the setting direction, and sets the minimum value in the extending direction as the coordinate condition (S48), and thereafter returns the processing to S35 to perform the processing from S35 to S43 of setting the Nth support member that extends in the negative extending direction to the three-dimensional product 61 or 62.

In the process of S37 of setting the Nth support member that extends in the negative extending direction to the three-dimensional product 61 or 62, as shown in the row of S37 in FIG. 10, in the specific example 1 or 2, the CPU 2 identifies a point Xmin having the minimum value of the X coordinate in the three-dimensional product 61 or 62 as the coordinate of the outer peripheral edge 66 or 67 in the range set in S36, and stores the point Xmin in association with the variable N and the variable M. In the specific example 1, as shown in FIG. 11, in S40, the CPU 2 temporarily sets a support member 26. As shown in FIG. 13, in S42, the CPU 2 identifies the intersection surface where the support member 26 temporarily set in S40 and the three-dimensional product 61 intersect each other, changes the end on the positive X side of the support member 26 temporarily set in S40 to the identified intersection surface, and sets the fourth support member 88 that extends in the setting direction set in S48, to the three-dimensional product 61. In other words, the support member 88 is set such that the end on the positive X side of the support member 88 is connected to the cutting margin 56 of the three-dimensional product 61. In the specific example 2, as shown in FIG. 12, in S40 the CPU 2 temporarily sets a support member 28. As shown in FIG. 14, since there is no other intersection than the point Xmin where the support member 28 temporarily set in S40 and the three-dimensional product 62 intersect each other, in S42 the CPU 2 extends the negative Z-side surface of the support member 28 temporarily set in S40 to the position where the support member 28 makes contact with the three-dimensional product 62 on the negative Z side, and sets the first support member 95 that extends in the setting direction set in S48, to the three-dimensional product 62. In other words, the support member 95 is set such that the negative Z-side surface of the end on the positive X side of the support member 95 is connected to the cutting margin 57 of the three-dimensional product 62.

When the setting direction is the negative extending direction (S44: NO), the CPU 2 determines whether the variable N is the number of the extension ranges set in S32 (S46). In the specific examples 1 and 2, when the variable N is not 4 (S46: NO), the CPU 2 increments the variable N by 1 (S47), and thereafter returns the processing to S34. When the variable N is 4 (S46: YES), the support member setting process by the CPU 2 is completed by the processing above, and the CPU 2 returns the processing to the data generation process shown in FIG. 2. The support member setting process is performed to set, in the specific example 1, the support members 81 to 88 formed to extend in the X direction as the longitudinal directions thereof, as shown in the row of S19 in FIG. 6. Each of the positive Z-side surfaces and the negative Z-side surfaces of the support members 81 to 84 is curved or inclined according to the shape of the outer peripheral edge 66. Each of the positive Z-side surfaces and the negative Z-side surfaces of the support members 85 to 88 is formed to extend in parallel to the XY plane according to the shape of the outer peripheral edge 66. Similarly, in the specific example 2, as shown in the row of S19 in FIG. 7, the support members 91 to 98 are set so as to extend in the X direction as the longitudinal directions thereof. In the specific example 3, as shown in the row of S19 in FIG. 8, the support members 101 to 108 are set so as to extend in the X direction as the longitudinal directions thereof.

The CPU 2 sets beams for the three-dimensional product 61, 62 or 63 (S20). As shown in the row of S20 in FIG. 6, in the specific example 1, the beams 111, 112 for the three-dimensional product 61 are set so as to be separated from the three-dimensional product 61 in the extending direction of the support members 81 to 88, and formed to extend in the width direction of the support members 81 to 88 so as to be connected to the other ends of the support members 81 to 88 on the sides far from the three-dimensional product 61 of the both ends in the extending direction. In the present embodiment, both ends of the beam 111 in the Y direction are connected to the columns 73, 74 set in S12, and both ends of the beam 112 in the Y direction are connected to the columns 71, 72 set in S12. The CPU 2 performs the following procedure to set the beams 111, 112. The CPU 2 sets the extension ranges in the X direction and the Y direction of the beams 111, 112, based on the four columns 71 to 74 set in S12. The CPU 2 sets the end in the negative X direction of the extension range in the X direction of the beam 112 between the columns 71, 72 at the position separated from the centers in the X direction of the columns 71, 72 by a distance D5 in the negative X direction. The distance D5 is longer than zero, and shorter than the radius of the columns 71, 73. The CPU 2 sets the end in the positive X direction of the extension range in the X direction of the beam 112 between the columns 71, 72, at the position of the ends in the positive X direction of the columns 71, 72. Similarly, the CPU 2 sets the end in the positive X direction of the extension range in the X direction of the beam 111 between the columns 73, 74, at the position separated from the centers in the X direction of the columns 73, 74, by the distance D5 in the positive X direction. The CPU 2 sets the end in the negative X direction of the extension range in the X direction of the beam 111 between the columns 73, 74, at the position of the end in the negative X direction of the columns 73, 74.

The CPU 2 sets the extension range in the Z direction of the beam 111 from the minimum value to the maximum value in the Z direction of the support members 81 to 84 connected to the beam 111. The CPU 2 sets the extension range in the Z direction of the beam 112 from the minimum value to the maximum value in the Z direction of the support members 85 to 88 connected to the beam 112. The CPU 2 sets the beams 111, 112 in quadrangular prism shapes so as to extend in the Y direction as the longitudinal directions thereof, based on the set extension ranges in the X direction, the Y direction and the Z direction. In the specific example 1, the three-dimensional model including the three-dimensional product 61, the four columns 71 to 74, the plate-shaped part 75, the support members 81 to 88, and the beams 111, 112 is also referred to as the modeled object 121. As shown in the row of S20 in FIG. 7, in the specific example 2, the beams 113, 114 are set in a similar procedure so as to extend in the Y direction as the longitudinal directions thereof. In the specific example 2, the three-dimensional model including the three-dimensional product 62, the four columns 71 to 74, the plate-shaped part 75, the support members 91 to 98, and the beams 113, 114 is also referred to as the modeled object 122. As shown in the row of S20 in FIG. 8, in the specific example 3, the beams 115, 116 are set so as to extend in the Y direction as the longitudinal directions thereof. In the specific example 3, the three-dimensional model including the three-dimensional product 63, the four columns 71 to 74, the plate-shaped parts 75 to 77, the support members 101 to 108, and the beams 115, 116 is also referred to as the modeled object 123.

The CPU 2 generates the three-dimensional modeling data for use in modeling the modeled object 121, 122 or 123 by the 3D printer 11 (S21). The format of the three-dimensional modeling data may be appropriately determined according to the format for modeling by the 3D printer 11. For example, the three-dimensional modeling data in the specific example 1 includes the data for use in modeling the modeled object 121, that is, the data representing the respective three-dimensional shapes of the three-dimensional product 40, the four columns 71 to 74 set in S12, the plate-shaped part 75 serving as the marker added in S15, the cutting margin 56 added in S16, the support members 81 to 88 set in S19, and the beams 111, 112 set in S20. The CPU 2 generates the three-dimensional cutting data for use in cutting the three-dimensional product 40 (S22). The three-dimensional cutting data represents the shape of the three-dimensional model that remains after the cutting by the cutting apparatus 12. For example, the three-dimensional cutting data in the specific example 1 includes the data representing the three-dimensional shape of the four columns 71 to 74 set in S12, the plate-shaped part 75 added in S15, and the three-dimensional product 40. The CPU 2 acquires the difference between the three-dimensional modeling data generated in S21 and the three-dimensional cutting data generated in S22 (S23). For example, in the specific example 1, the CPU 2 acquires the data representing the respective three-dimensional shapes of the cutting margin 56 added in S16, the support members 81 to 88 set in S19, and the beams 111, 112 set in S20. The CPU 2 generates NC data for use in cutting the modeled object 121, 122 or 123 by the cutting apparatus 12, based on the difference acquired in S23 (S24). For example, in the specific example 1, the CPU 2 generates NC data for use in cutting and removing, from the modeled object 121, the cutting margin 56 added in S16, the support members 81 to 88 set in S19, and the beams 111, 112 set in S20 which are included in the difference acquired in S23. The CPU 2 outputs the three-dimensional modeling data generated in S21 to the 3D printer 11, and outputs the NC data for the cutting apparatus 12 generated in S24 to the cutting apparatus 12 (S25). The data generation process by the CPU 2 is completed by the processing above. In the system 9, the 3D printer 11 performs a process of modeling the modeled object 121, 122 or 123 based on the three-dimensional modeling data outputted by the data generation apparatus 1. The cutting apparatus 12 performs cutting and processing on the modeled object 121, 122 or 123 modeled by the 3D printer 11 based on the NC data for the cutting apparatus 12 outputted by the data generation apparatus 1, thereby creating the three-dimensional product 40 of which the surfaces to be cut have been cut.

In the data generation process in the first embodiment described above, in the specific example 1, the support members 81 to 88 are set along the shape of the outer peripheral edge 66 of the three-dimensional product 61. In the data generation process of a second embodiment, support members having a particular YZ cross-sectional shape (the shape of a cross-section parallel to the YZ plane) are set at positions identified by the outer peripheral edge 66 of the three-dimensional product 61. The data generation process of the second embodiment will be described with reference to FIGS. 15, 16A and 16B. The data generation process in the second embodiment and the data generation process in the first embodiment differ from each other in the support member setting process of S19, and are the same with respect to other processing. In FIG. 15, the steps in the support member setting process which are the same as the steps in the first embodiment shown in FIG. 5 are indicated with the same step numbers. As shown in FIG. 15, the support member setting process of the second embodiment differs from the support member setting process of the first embodiment, in that the steps from S51 to S56 instead of the steps from S35 to S43 are performed. The other steps in the support member setting process are the same as those in the support member setting process of the first embodiment. The same steps as those in the support member setting process of the first embodiment will not be described or will be described simply herein, and the steps from S51 to S56 different from the steps in the support member setting process of the first embodiment will be described by use of the similar specific examples 1 and 2 in the first embodiment.

The CPU 2 acquires the extension ranges of the Nth support member set in S33 (S51). The CPU 2 identifies a representative outer peripheral edge part of the outer peripheral edge 66 or 67 in the extension ranges of the Nth support member acquired in S51, according to a particular condition (S52). The particular condition may be set as appropriate. For example, the coordinate which satisfies the coordinate condition of a representative point such as of one end, the other end, or the center in the Y direction of the extension ranges of the Nth support member acquired in S51 may be specified as the representative outer peripheral edge part. The coordinate which satisfies the coordinate condition of the extension ranges of the Nth support member acquired in S51 may be specified as the representative outer peripheral edge part. In one example, the CPU 2 identifies, as the representing outer peripheral edge, the point having a larger Z coordinate value from among the point of one end in the Y direction on the coordinate satisfying the coordinate condition and the point of the other end in the Y direction on the coordinate satisfying the coordinate condition, in the extension range of the Nth support member acquired in S51.

The CPU 2 temporarily sets, to the three-dimensional product 61 or 62, the Nth support member extending in the setting direction set in S34 or S48 as in the first embodiment, based on the representative outer peripheral edge part set in S52, the condition of the position specified by the representative outer peripheral edge part, the condition of the YZ cross-sectional shape, and the arrangement conditions set in S30 (S53). The condition of the position identified by the representative outer peripheral edge part may be set as appropriate according to the identification condition of the representative outer peripheral edge part, and is, for example, a position at which at least a part of one end of the support member in the extending direction is in contact with the representative outer peripheral edge part identified in S52. As the condition of the YZ cross-sectional shape, for example, any of rectangular, circular, elliptical, and polygonal shapes may be used. The respective conditions may be set by a user, or set in advance. For example, when the representative outer peripheral edge part is the point of the end in the positive Y direction in the extension range of the Nth support member, the CPU 2 sets the quadrangular prism support member having the rectangular shape in the YZ cross-sectional shape, in which the representative outer peripheral edge part is positioned at the vertex of the negative Z side and the positive Y side. The CPU 2 sets the position of the end on the opposite side of the setting direction of the Nth support member, as in S40 of the first embodiment.

The CPU 2 determines whether there is an intersection between the three-dimensional product 61 or 62 and any of the two sides extending in the X direction on the positive Z side, of the Nth support member formed in the quadrangular prism shape set in S53 (S54). In the specific example 1, the CPU 2 determines that there is an intersection (S54: YES), and the CPU 2 performs a process of setting a support member on the convex surface 41 (S55). The CPU 2 sets a support member such that at least a part of one end on the side of the three-dimensional product 61 of the support member in the extending direction is connected to the cutting margin 56 of the three-dimensional product 61. The CPU 2 identifies the intersection surface where one end of the support member temporarily set in S53 in the extending direction intersects the three-dimensional product 61, and changes the one end of the support member temporarily set in S53 in the extending direction to the identified intersection surface. The CPU 2 maintains the temporarily set condition for the part not intersecting the three-dimensional product 61, of the one end of the support member temporarily set in S53 in the extending direction. In the specific example 1, the support member setting process is performed to set the support members 131 to 138 as shown in FIG. 16A. The support members 135 to 138 are formed to extend from the side surface on the negative X direction of the three-dimensional product 61 toward the negative X direction, and are not visible from the positive X direction. Accordingly, in FIG. 16A, the positions in the Z direction and the Y direction of the support members 135 to 138 are indicated with virtual lines. The surfaces on the positive Z side and the surfaces on the negative Z side of the support members 131 to 138 are parallel to the XY plane, regardless of the shape of the outer peripheral edge 66 of the three-dimensional product 61. In the specific example 2, the CPU 2 determines that there is no intersection (S54: NO), and the CPU 2 performs a process of setting a support member on the concave surface 42 (S56). The processing as in S43 in the first embodiment is performed to set the support members 141 to 148 as shown in FIG. 16B. The surfaces on the positive Z side and the surfaces on the negative Z side of the support members 141 to 148 are parallel to the XY plane, regardless of the shape of the outer peripheral edge 67 of the three-dimensional product 62.

In the data generation apparatus 1 and the system 9 of the first and second embodiments, the data generation apparatus 1, the CPU 2, the 3D printer 11, and the cutting apparatus 12 are examples of the computer, the controller, the three-dimensional modeling apparatus, and the cutting apparatus of the present disclosure, respectively. The processing of S1 is an example of a data acquisition step of the present disclosure. The processing of step S30 is an example of a condition acquisition step of the present disclosure. S31 and S32 are examples of a direction setting step of the present disclosure. The processing of S42, S43, S55, and S56 is an example of a support member setting step of the present disclosure. The processing of S20 is an example of a beam setting step of the present disclosure. The processing of Step S21 is an example of a modeling data generation step of the present disclosure. The processing of S25 is an example of an output step of the present disclosure. The processing of S22 and S24 is an example of a cutting data generation step of the present disclosure. The processing of S4 and S6 is an example of a reception step of the present disclosure. The processing of S37 and S52 is an example of an edge identifying step of the present disclosure.

The effects of the data generation program and the system 9 of the first and second embodiments described above will be described mainly using the specific example 1 of the first embodiment, and the description will be omitted as appropriate when the same effects are acquired in the case of the specific examples 2 and 3 and the case of the second embodiment. According to the data generation program and the system 9 of the first and second embodiments, by executing the data generation program, the data generation apparatus 1 generates three-dimensional modeling data for modeling the modeled object 121 including the three-dimensional product 40, the cutting margin 56, the support members 81 to 88, and the beams 111 and 112 by using the three-dimensional printer 11. The support members 81 to 88 extend in the extending direction according to the arrangement condition, and one ends thereof in the extending direction are connected to the cutting margin 56 added to the three-dimensional product 40. The support members 81 to 88 are removed together with the cutting margin 56 by removing the cutting margin 56 from the three-dimensional product 40 by the cutting apparatus 12. Thus, it is not necessary for the user to provide a step of removing the support members 81 to 88 from the modeled object 121 in order to acquire the three-dimensional product 40 from the modeled object 121, separately from the step of removing the cutting margin 56 from the modeled object 121. In other words, the data generation program generates three-dimensional modeling data for modeling the three-dimensional product 61 and the support members 81 to 88 connected to the three-dimensional product 61 using the 3D printer 11, taking into consideration that the support members 81 to 88 are removed from the three-dimensional product 40. The data generation program automatically sets the arrangement of the support members 81 to 88 such that one ends thereof in the extending direction are connected to the cutting margin 56, which reduces the burden on the user compared with a conventional program. The CPU 2 of the present embodiment sets an extension range of the beam 111 based on extension ranges of the support members 81 to 84 connecting to the beam 111, and sets an extension range of the beam 112 based on extension ranges of the support members 85 to 88 connecting to the beam 112. Thus, the size of the beams 111 and 112 in the Z direction is constant over the Y direction, and also the size of the beams 111 and 112 in the Z direction is minimized. Thus, according to the data generation program, the modeling time of the modeled object 121 is shortened and the use amount of the material of the modeled object 121 is reduced, compared with a case where the size of the beam 111 in the Z direction is set without considering the extension ranges of the support members 81 to 84 connected to the beam 111 and the size of the beam 112 in the Z direction is set without considering the extension ranges of the support members 85 to 89 connected to the beam 112.

The data generation program includes an instruction for executing processes (S22, S24) of generating three-dimensional cutting data for cutting and removing the cutting margin 56 and the one ends of the support members 81 to 88 of the modeled object 121 by the cutting apparatus 12. In S25, the CPU 2 outputs three-dimensional modeling data and three-dimensional cutting data (S25). Thus, the data generation program and system 9 save the user's time and effort to generate three-dimensional cutting data separately from three-dimensional modeling data. Since the data generation program and the system 9 generate three-dimensional cutting data using the process necessary to generate three-dimensional modeling data, the process of generating the three-dimensional cutting data is simplified compared with a case where the three-dimensional cutting data is generated separately from the three-dimensional modeling data.

The data generation program includes an instruction for executing a process of accepting designation of a cutting surface at one side in the height direction of the three-dimensional product 40 (S4 and S6). In S31 and S32, the extending direction, the width direction, and the height direction of the support members 81 to 88 are set based on the designated cutting surface. The data generation program improves convenience of the user, as compared with a program in which the user cannot designate a cutting surface. The data generation program saves the time and labor of the user to set the extending direction, the width direction, and the height direction of the support members 81 to 88 separately from the cutting surface.

The arrangement conditions acquired in S30 include the width Q in the width direction of the support members 81 to 88, the height H in the height direction of the support members 81 to 88, and the pitch P that is the distance corresponding to the interval between adjacent support members. Therefore, the data generation program improves the degree of freedom in the arrangement of the support members 81 to 88 as compared with a program in which the user cannot specify the arrangement condition. The CPU 2 of the present embodiment uses the center D of the three-dimensional product 61 in the Y direction to set the arrangement of the support members 81 to 88, which reduces the possibility that the support members 81 and 88 are arranged at deviated positions in the Y direction.

The data generation program includes an instruction for setting an extension range in the width direction of the support member based on the arrangement condition acquired in S 30 (S32) and identifying the outer peripheral edge 66 of the cutting surface in an extension range in the width direction of the support members 81 to 88 based on the three-dimensional data of the three-dimensional product 61 (S37 and S52). The support members 81 to 88 or the support member 131 to 138 extending by the height H in the height direction thereof are set at positions corresponding to the outer peripheral edge 66 of the identified cutting surface in the cutting margin 56 added to the three-dimensional product 40 (S42, S43, S55, and S56). The data generation program generates three-dimensional molding data in which the lengths of the support members 81 to 88 in the extending direction are set shorter than a case where the support members 81 to 88 are set at positions corresponding to the center of the cutting surface. This enables the data generation program to shorten the modeling time of the modeled object 121 and to reduce the amount of use of the material of the modeled object 121.

The position corresponding to the outer peripheral edge 66 of the data generation program is a position at which at least part of one ends of the support members 81 to 88 in the extending direction is in contact with the outer peripheral edge 66. Thus, the data generation program generates three-dimensional modeling data in which the lengths of the support members 81 to 88 in the extending direction are set to be shorter than a case where the one ends of the support members 81 to 88 in the extending direction is separated from the outer peripheral edge 66. This enables the data generation program to shorten the modeling time of the modeled object 121 and to reduce the amount of use of the material of the modeled object 121.

In S37 or S52, the CPU 2 identifies the outer peripheral edge 66 of the cutting surface of the three-dimensional product 61 to which the cutting margin 56 is added, based on the maximum or minimum value in the extending direction of the three-dimensional data of the three-dimensional product 61 within the extension range of the support members 81 to 88 in the width direction. This enables the data generation program to identify the outer peripheral edge 66 of the cutting surface in the cutting margin 56 by a simple process as compared with a case where the entire three-dimensional data of the three-dimensional product 61 is scanned to identify the outer peripheral edge 66 of the three-dimensional product 61.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(A) The configuration of the data generation apparatus 1 and the system 9 may be changed as appropriate. The data generation apparatus 1 may be a dedicated apparatus or may be a general-purpose apparatus, as long as the data generation apparatus 1 is configured to generate three-dimensional modeling data based on three-dimensional data representing a three-dimensional product. The system 9 may include only the 3D printer 11 and the cutting apparatus 12, and the data generation process may be executed by a controller of at least the 3D printer 11 or the cutting apparatus 12.

(B) The program including instructions for executing the data generation process of FIG. 2 may be stored in a storage device of the system 9 by the time when the CPU 2 executes the program. Accordingly, each of the acquisition method and the acquisition route of the program, and a device storing the program may be changed as appropriate. The program to be executed by the CPU 2 may be received from another apparatus via a cable or wireless communication and may be stored in a storage device such as a flash memory. The other apparatuses include, for example, a PC and a server connected via a network.

(C) Each step of the process executed by the system 9 is not limited to an example performed by the data generation apparatus 1, and some or all of the processes executed by the system 9 may be executed by other electronic devices (for example, ASIC) of the system 9. Each step of the data generation process may be executed in a distributed manner by a plurality of electronic devices (for example, a plurality of CPUs). The order of steps of the data generation process may be changed as necessary. In the data generation process, a step may be omitted and a step may be added as necessary. It is also within the scope of the present disclosure that an operating system (OS) and so on in the data generation apparatus 1 performs a part or all of the data generation process based on an instruction from the CPU 2. For example, the following changes may be added to the data generation process as appropriate.

At least one of the processes from S22 to S24 may be omitted or may be executed by the cutting apparatus 12 instead of the data generation apparatus 1. For example, the data generation apparatus 1 may execute the process of S22 and may output the three-dimensional modeling data and the three-dimensional cutting data generated in S25 to the cutting apparatus 12. The cutting apparatus 12 may execute the processes of S23 and S24 based on the three-dimensional modeling data and the three-dimensional cutting data outputted from the data generation apparatus 1.

At least one of the processing for setting the support members 81 to 88, 91 to 98, 101 to 108, 131 to 138, 141 to 148, the beams 111 to 116, and four columns 71 to 74 may be changed as appropriate. The processing of S12 may be omitted such that the four columns 71 to 74 are not set. In this case, both ends of the beams 111 and 112 in the width direction of the support members 81 to 88 set in the specific example 1 of the first embodiment may be formed in a particular shape without being connected to the columns 71 to 74. The extension range of the beam 111 in the height direction of the support members 81 to 84 may be set independently of the extension range of the support members 81 to 84 connected to the beam 111, and may be set according to the extension range of the three-dimensional product 61 similarly to the columns 71 to 74, for example. At least one of the processes from S3 to S9 may be omitted, and the setting method may be changed as appropriate. The arrangement condition acquired in S30 may not include at least one of the width in the width direction of the support members 81 to 88, the height in the height direction of the supports 81 to 88, and the interval between adjacent support members 81 to 88, or may include other conditions. The method of identifying the outer peripheral edge 66 may be appropriately changed. The three-dimensional data may be scanned to identify an outer peripheral surface of the three-dimensional product 61 and to identify the outer peripheral edge 66. The outer peripheral edge 413 may be identified based on three-dimensional data of the three-dimensional product 40, and the outer peripheral edge 66 may be identified based on the identified outer peripheral edge 413 and the cutting margin 56. The support members 81 to 88 set for the three-dimensional product 61 may be arranged at positions that are shifted by particular distances from the outer peripheral edge 66 based on the outer peripheral edge 66 of the three-dimensional product 61. In the support members 81 to 88 set for the three-dimensional product 61, at least part of one end of the supports 81 to 88 at the three-dimensional product 61 side in the extending direction may be connected to the cutting margin 56, and the arrangement may be determined without identifying the outer peripheral edge 66 of three-dimensional product 61.

What is claimed is:

1. A non-transitory computer-readable storage medium storing a data generation program including a set of program instructions for a computer comprising a controller, the set of program instructions, when executed by the controller, causing the computer to perform:
    acquiring three-dimensional data representing a three-dimensional shape of a three-dimensional product;
    acquiring an arrangement condition for arranging a support member to the three-dimensional product, the support member being connected to the three-dimensional product;
    setting an extending direction, a width direction, and a height direction of the support member;
    adding a cutting margin of a particular thickness to a cutting surface of the three-dimensional product at one side in the height direction;
    setting the support member in accordance with the arrangement condition, the support member extending in the extending direction, one end of the support member in the extending direction being connected to the cutting margin added to the three-dimensional product;
    setting a beam, the beam being spaced from the three-dimensional product having the cutting margin in the extending direction, the beam extending in the width direction, the beam being connected to an other end of the support member in the extending direction;
    generating three-dimensional modeling data for modeling a modeled object by using a three-dimensional (3D) printer, the modeled object including the three-dimensional product, the cutting margin, the support member, and the beam; and
    outputting the three-dimensional modeling data.

2. The non-transitory computer-readable storage medium according to claim 1, wherein the set of program instructions, when executed by the controller, causes the computer to perform:
  generating three-dimensional cutting data for cutting and removing, with a cutting blade, the cutting margin and the one end of the support member in the modeled object; and
  wherein the outputting includes outputting the three-dimensional modeling data and the three-dimensional cutting data.

3. The non-transitory computer-readable storage medium according to claim 1, wherein the set of program instructions, when executed by the controller, causes the computer to perform:
  receiving designation of the cutting surface at the one side in the height direction; and
  wherein the setting the extending direction, the width direction, and the height direction includes setting the extending direction, the width direction, and the height direction of the support member based on the designation of the cutting surface.

4. The non-transitory computer-readable storage medium according to claim 1, wherein the support member comprises a plurality of support members arranged in the width direction; and
  wherein the arrangement condition includes a width of each of the plurality of support members in the width direction, a height of each of the plurality of support members in the height direction, and a length based on an interval between adjacent ones of the plurality of support members.

5. The non-transitory computer-readable storage medium according to claim 1, wherein the set of program instructions, when executed by the controller, causes the computer to perform:
  setting an extension range of the support member in the width direction based on the arrangement condition; and
  identifying, based on the three-dimensional data, an outer peripheral edge of the cutting surface within the extension range of the support member in the width direction; and
  wherein the setting the support member includes setting the support member to the cutting margin at a position corresponding to the identified outer peripheral edge, the support member extending by a height in the height direction, the height being included in the arrangement condition.

6. The non-transitory computer-readable storage medium according to claim 5, wherein the position corresponding to the identified outer peripheral edge is a position at which at least part of the one end of the support member in the extending direction is in contact with the outer peripheral edge.

7. The non-transitory computer-readable storage medium according to claim 5, wherein the identifying the outer peripheral edge includes identifying the outer peripheral edge of the cutting surface of the three-dimensional product to which the cutting margin is added, based on a maximum value or a minimum value of the three-dimensional data in the extending direction within the extension range in the width direction of the support member.

8. The non-transitory computer-readable storage medium according to claim 1, wherein the support member includes:
  a plurality of first support members located at one side of the three-dimensional product in the extending direction, the plurality of first support members being arranged in the width direction; and
  a plurality of second support members located at an other side of the three-dimensional product in the extending direction, the plurality of second support members being arranged in the width direction;
  wherein the beam includes:
    a first beam connected to the plurality of first support members; and
    a second beam connected to the plurality of second support members;
  wherein the modeled object further includes four columns, each of the four columns extending in the height direction;
  wherein both ends of the first beam in the width direction are connected to two of the four columns; and
  wherein both ends of the second beam in the width direction are connected to other two of the four columns.

9. The non-transitory computer-readable storage medium according to claim 1, wherein the support member includes a plurality of support members arranged in the width direction; and
  wherein the setting the support member includes setting extension ranges of the plurality of support members in the width direction according to an equation 1, wherein Y is a coordinate value of the plurality of support members in the width direction, a center D of the three-dimensional product in the width direction is used as a reference, a distance E is a distance between the center D and the support member adjacent to the center D; a pitch P is a distance in the width direction of adjacent ones of the plurality of support members; and a width Q is a width of each of the plurality of support members in the width direction, variables Y, D, E and P in equation 1 are set so as to satisfy an equation 2, and a value of n in the equations 1 and 2 is an integer, wherein the following equations are satisfied:

equation 1 is $Y=D\pm E, D\pm(E+P\times n)$; and equation 2 is (Maximum size of the three-dimensional product in the width direction)$/2 > (E+P\times n+Q)$.

10. The non-transitory computer-readable storage medium according to claim 9, wherein the setting the support member further includes:
  dividing each of the extension ranges of the plurality of support members into a plurality of divided ranges;
  identifying, based on the three-dimensional data, an outer peripheral edge of the cutting surface of the three-dimensional product in each of the plurality of divided ranges; and
  setting the support member based on the outer peripheral edge identified in each of the plurality of divided ranges.

11. A three-dimensional modeling system comprising a computer, a three-dimensional (3D) printer, and a cutting blade,
  the computer comprising:
    an interface; and
    a controller configured to perform:
      acquiring three-dimensional data representing a three-dimensional shape of a three-dimensional product;
      acquiring an arrangement condition for arranging a support member to the three-dimensional product, the support member being connected to the three-dimensional product;

setting an extending direction, a width direction, and a height direction of the support member;

adding a cutting margin of a particular thickness to a cutting surface of the three-dimensional product at one side in the height direction;

setting the support member in accordance with the arrangement condition, the support member extending in the extending direction, one end of the support member in the extending direction being connected to the cutting margin added to the three-dimensional product;

setting a beam, the beam being spaced from the three-dimensional product having the cutting margin in the extending direction, the beam extending in the width direction, the beam being connected to an other end of the support member in the extending direction;

generating three-dimensional modeling data for modeling a modeled object by using the 3D printer, the modeled object including the three-dimensional product, the cutting margin, the support member, and the beam;

generating three-dimensional cutting data for cutting and removing, with the cutting blade, the cutting margin and the one end of the support member in the modeled object; and outputting the three-dimensional modeling data and the three-dimensional cutting data through the interface, the 3D printer being configured to model the modeled object in accordance with the three-dimensional modeling data, the cutting blade being configured to cut the modeled object in accordance with the three-dimensional cutting data to obtain the three-dimensional product.

12. The three-dimensional modeling system according to claim 11, wherein the controller is configured to perform:

receiving designation of the cutting surface at the one side in the height direction; and setting the extending direction, the width direction, and the height direction of the support member based on the designation of the cutting surface.

13. The three-dimensional modeling system according to claim 11, wherein the support member comprises a plurality of support members arranged in the width direction; and wherein the arrangement condition includes a width of each of the plurality of support members in the width direction, a height of each of the plurality of support members in the height direction, and a length based on an interval between adjacent ones of the plurality of support members.

14. The three-dimensional modeling system according to claim 11, wherein the controller is configured to perform:

setting an extension range of the support member in the width direction based on the arrangement condition;

identifying, based on the three-dimensional data, an outer peripheral edge of the cutting surface within the extension range of the support member in the width direction; and setting the support member to the cutting margin at a position corresponding to the identified outer peripheral edge, the support member extending by a height in the height direction, the height being included in the arrangement condition.

15. The three-dimensional modeling system according to claim 14, wherein the position corresponding to the identified outer peripheral edge is a position at which at least part of the one end of the support member in the extending direction is in contact with the outer peripheral edge.

16. The three-dimensional modeling system according to claim 14, wherein the controller is configured to perform:

identifying the outer peripheral edge of the cutting surface of the three-dimensional product to which the cutting margin is added, based on a maximum value or a minimum value of the three-dimensional data in the extending direction within the extension range in the width direction of the support member.

17. The three-dimensional modeling system according to claim 11, wherein the support member includes:

a plurality of first support members located at one side of the three-dimensional product in the extending direction, the plurality of first support members being arranged in the width direction; and a plurality of second support members located at an other side of the three-dimensional product in the extending direction, the plurality of second support members being arranged in the width direction;

wherein the beam includes:

a first beam connected to the plurality of first support members; and a second beam connected to the plurality of second support members;

wherein the modeled object further includes four columns, each of the four columns extending in the height direction;

wherein both ends of the first beam in the width direction are connected to two of the four columns; and wherein both ends of the second beam in the width direction are connected to other two of the four columns.

18. The three-dimensional modeling system according to claim 11, wherein the support member includes a plurality of support members arranged in the width direction; and wherein the controller is configured to perform:

setting extension ranges of the plurality of support members in the width direction according to an equation 1, wherein Y is a coordinate value of the plurality of support members in the width direction, a center D of the three-dimensional product in the width direction is used as a reference, a distance E is a distance between the center D and the support member adjacent to the center D; a pitch P is a distance in the width direction of adjacent ones of the plurality of support members; and a width Q is a width of each of the plurality of support members in the width direction, variables Y, D, E and P in equation 1 are set so as to satisfy an equation 2, and a value of n in the equations 1 and 2 is an integer, wherein the following equations are satisfied:

equation 1 is $Y=D\pm E$, $D\pm(E+P\times n)$; and equation 2 is (Maximum size of the three-dimensional product in the width direction)/$2>(E+P\times n+Q)$.

19. The three-dimensional modeling system according to claim 18, wherein the controller is configured to further perform:

dividing each of the extension ranges of the plurality of support members into a plurality of divided ranges;

identifying, based on the three-dimensional data, an outer peripheral edge of the cutting surface of the three-dimensional product in each of the plurality of divided ranges; and setting the support member based on the outer peripheral edge identified in each of the plurality of divided ranges.

* * * * *